(12) United States Patent
McGee et al.

(10) Patent No.: US 10,744,978 B2
(45) Date of Patent: Aug. 18, 2020

(54) WIPER ADAPTER AND WIPER ASSEMBLY INCORPORATING THE SAME

(71) Applicant: Trico Products Corporation, Rochester Hills, MI (US)

(72) Inventors: Alexander McGee, Auburn Hills, MI (US); Mitica Polocoser, Wayne, MI (US); Valentin Avasiloaie, Dearborn Heights, MI (US); Kyle Moll, Oxford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 73 days.

(21) Appl. No.: 16/077,530

(22) PCT Filed: Feb. 15, 2017

(86) PCT No.: PCT/US2017/018005
§ 371 (c)(1),
(2) Date: Aug. 13, 2018

(87) PCT Pub. No.: WO2017/142971
PCT Pub. Date: Aug. 24, 2017

(65) Prior Publication Data
US 2019/0039574 A1   Feb. 7, 2019

Related U.S. Application Data

(60) Provisional application No. 62/295,398, filed on Feb. 15, 2016.

(51) Int. Cl.
*B60S 1/40* (2006.01)
*B60S 1/38* (2006.01)

(52) U.S. Cl.
CPC ............. *B60S 1/4048* (2013.01); *B60S 1/381* (2013.01); *B60S 1/387* (2013.01); *B60S 1/4003* (2013.01);
(Continued)

(58) Field of Classification Search
CPC .... B60S 1/4003; B60S 1/4045; B60S 1/4048; B60S 1/40; B60S 2001/4051; B60S 2001/4054; B60S 1/381; B60S 1/387
(Continued)

(56) References Cited

U.S. PATENT DOCUMENTS

| 2010/0107354 A1 | 5/2010 | Verelst et al. |
| 2012/0222231 A1* | 9/2012 | Ku ....................... B60S 1/4087 15/250.32 |
| 2015/0274132 A1 | 10/2015 | Polocoser et al. |

FOREIGN PATENT DOCUMENTS

| WO | WO 02/40328 A1 * | 5/2002 |
| WO | 2015153606 | 10/2015 |

* cited by examiner

*Primary Examiner* — Gary K. Graham
(74) *Attorney, Agent, or Firm* — Miller Canfield

(57) ABSTRACT

An adapter for attaching to a wiper arm attachment member having a track defined by a base and walls depending therefrom, a bent tab extending outwardly from the base, and fins that extend from the walls. The adapter has a body with a first and second ends. A stop wall formed at the first end abuts the track. A pair of outer walls extend between the first and second ends. A strap connects the outer walls for engaging the base. A pair of inner walls are spaced laterally between the outer walls and are arranged at least partially under the strap. A cantilevered finger extends from each of the inner walls with a tab formed adjacent to the second end. The tabs extend away from each other and are arranged to engage respective fins to prevent movement between the adapter and the attachment member when the stop wall abuts the track.

4 Claims, 21 Drawing Sheets

(52) U.S. Cl.
 CPC ............. *B60S 2001/4051* (2013.01); *B60S 2001/4054* (2013.01)

(58) Field of Classification Search
 USPC ...................................... 15/250.32
 See application file for complete search history.

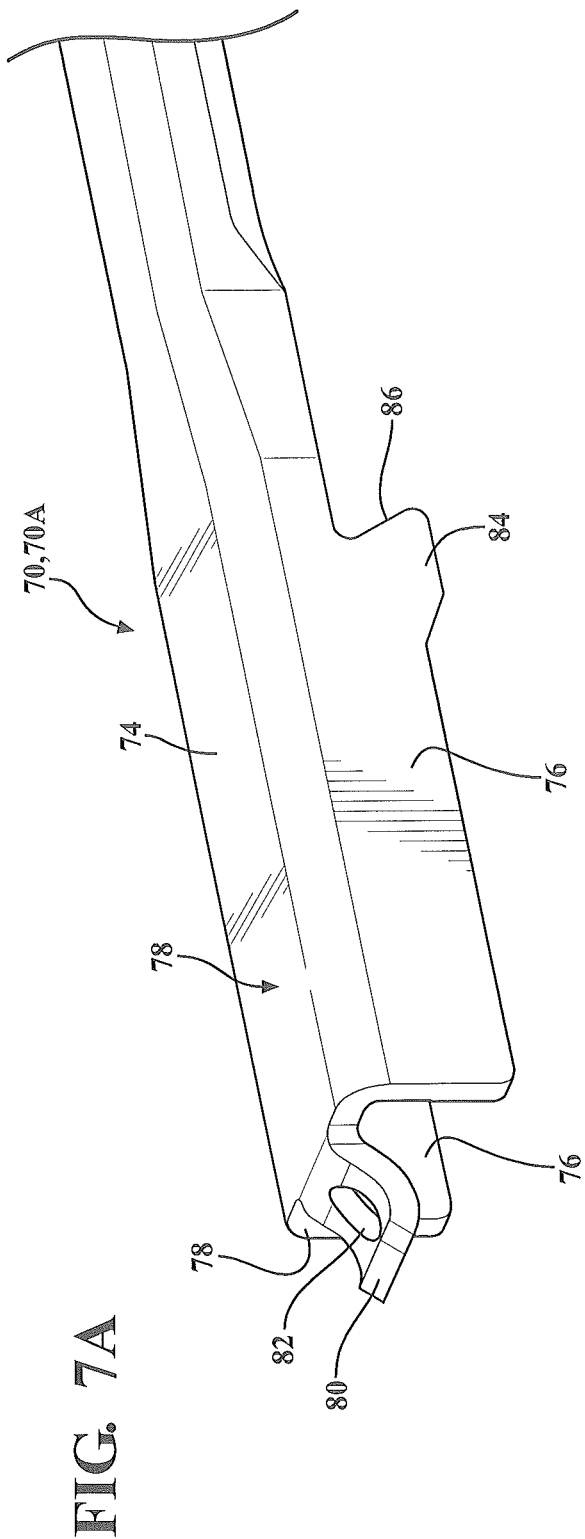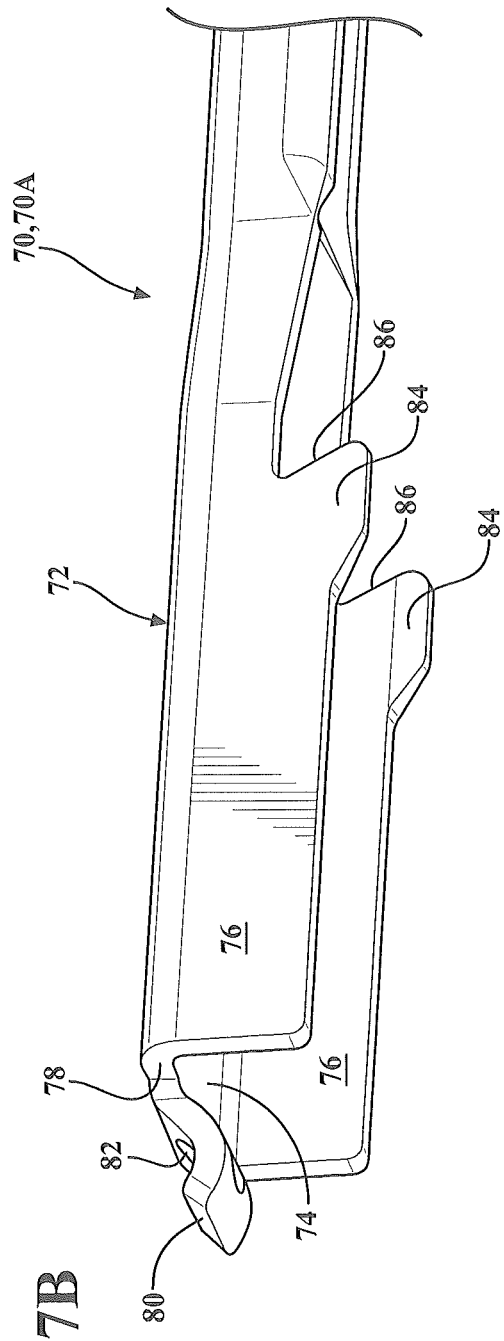
FIG. 7A
FIG. 7B

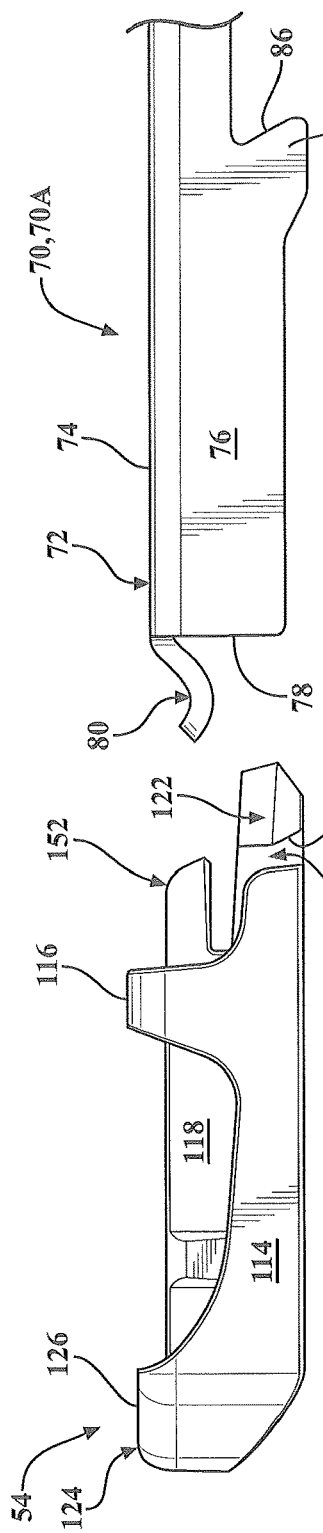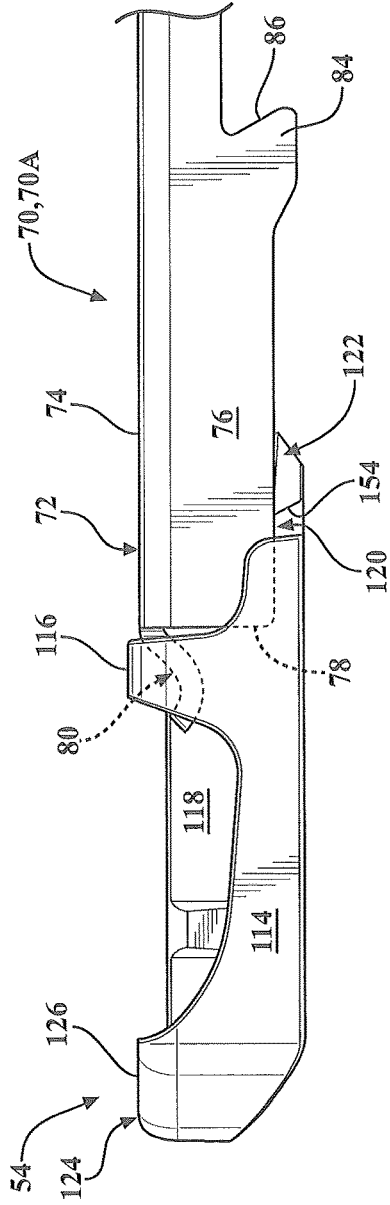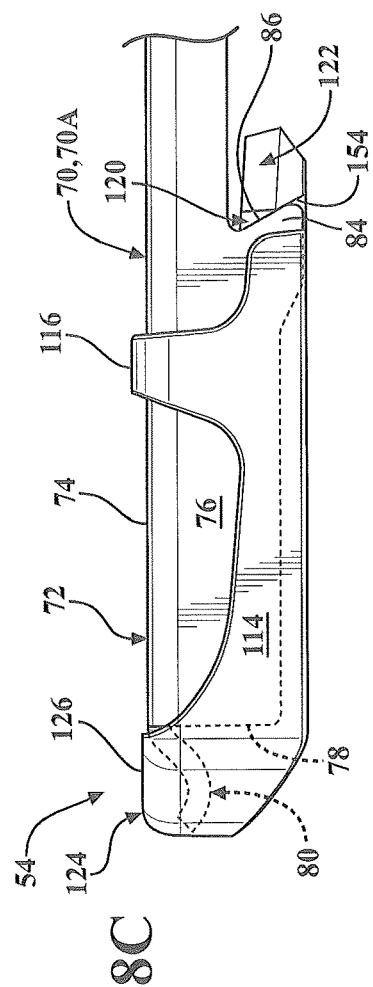

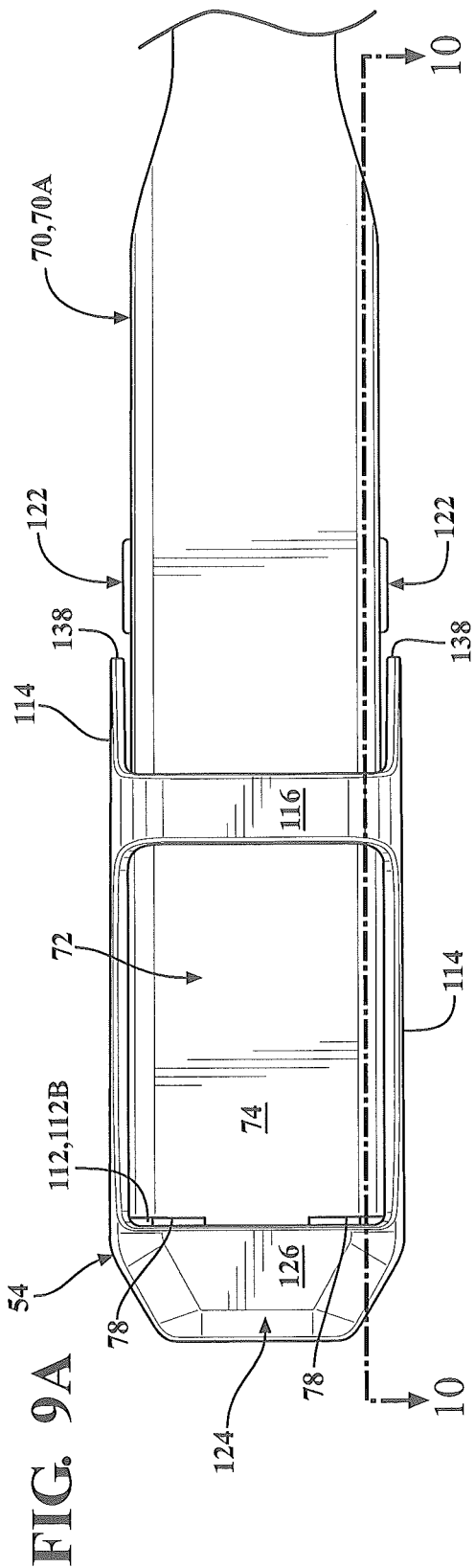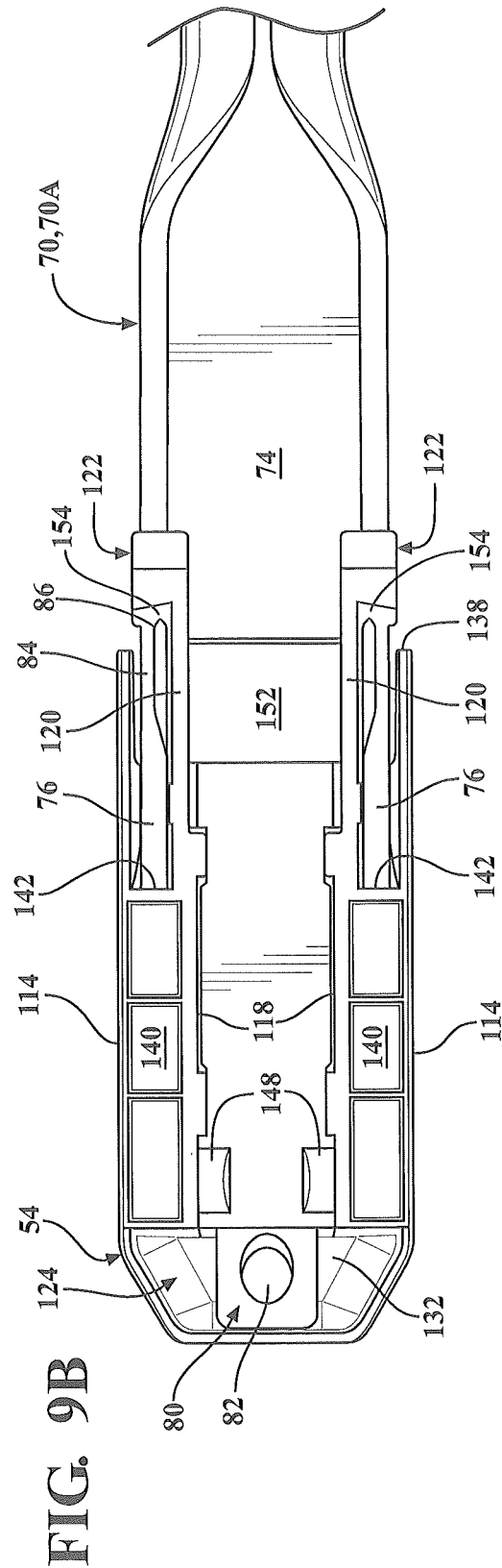

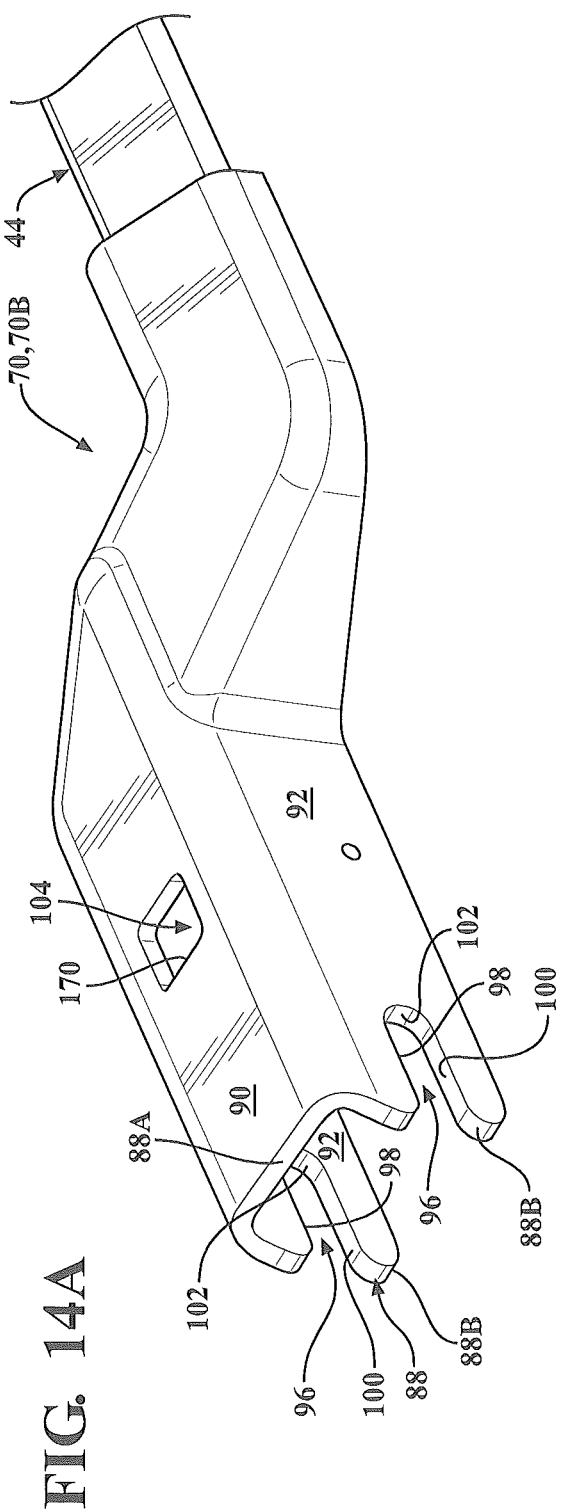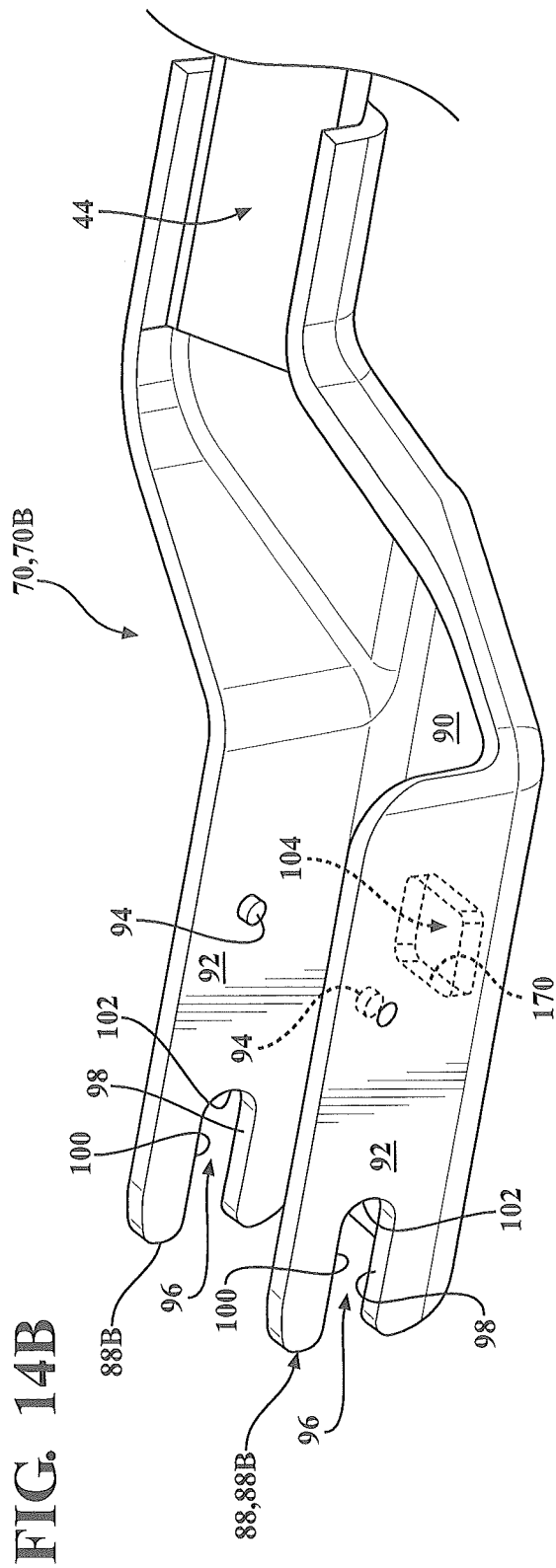

WIPER ADAPTER AND WIPER ASSEMBLY INCORPORATING THE SAME

CROSS-REFERENCE TO RELATED APPLICATION

This application claims priority to and all the benefits of U.S. Provisional Application No. 62/295,398, filed Feb. 15, 2016.

BACKGROUND OF THE INVENTION

1. Field of the Invention

The present invention relates, generally, to wiper systems and, more specifically, to wiper adapters for wiper assemblies.

2. Description of the Related Art

Conventional automotive wiper systems known in the art typically include some type of wiper assembly (sometimes referred to as a wiper blade) mounted to a wiper arm which, in turn, is mounted adjacent to a surface to be wiped, such as a windshield of a vehicle, and is pivotally driven to impart reciprocal motion to the wiper assembly across the windshield. The wiper assembly typically includes a rubber wiping element that contacts the windshield across the surface to be wiped. Modern wiper assemblies often employ one or more metal strips that act to reinforce the wiping element and facilitate wiping of the wiping element across what is typically a curved glass surface. The wiper assembly also typically includes a coupler that attaches to and supports the one or more metal strips, and an adapter pivotally attached to the coupler. The adapter allows the wiper assembly to be releasably attached to the wiper arm. In this context, the wiper arm delivers a downward force to the wiper assembly in use. The force is distributed across the wiper assembly so as to press the wiper assembly into contact with the windshield. The wiper assembly also typically includes an airfoil that attaches to the metal strips, and may also include end caps located at respective longitudinal ends of the wiper assembly.

Each of the components of a wiper assembly of the type described above must cooperate to effectively clean a surface to be wiped. In addition, each of the components must be designed not only to facilitate an improved wipe quality, but also so as to reduce the cost and complexity of assembling the wiper assembly.

While wiper assemblies known in the related art have generally performed well for their intended purpose, there remains a need in the art for a wiper assembly that has superior operational characteristics, reduces the cost of manufacturing the assembly, and provides simple releasable attachment to wiper arms.

SUMMARY OF THE INVENTION

The present invention overcomes the disadvantages in the related art in an adapter for use in releasably attaching a wiper assembly to a wiper arm having an attachment member. The attachment member has a track defined by a base and walls depending therefrom, a bent tab extending outwardly from the base, and fins that extend from the walls. The adapter has a body with a first end and a second end. A stop wall is formed adjacent to the first end of the body for abutting at least a portion of the track of the attachment member of the wiper arm. A pair of outer walls extend longitudinally between the first end and the second end. A strap connects the outer walls for engaging the base of the attachment member of the wiper arm. A pair of inner walls are spaced laterally between the outer walls and are arranged at least partially under the strap. A cantilevered finger extends longitudinally from each of the inner walls with a locking tab formed adjacent to the second end. The locking tabs extend laterally away from each other and are arranged so as to respectively engage the fins of the attachment member so as to prevent longitudinal movement between the adapter and the attachment member when the stop wall abuts the track of the attachment member.

In addition, the present invention is directed toward a wiper assembly for use in releasably attaching to a wiper arm attachment member. The wiper arm attachment member has a track defined by a base and walls depending therefrom, a bent tab extending outwardly from the base, and fins that extend from the walls. The wiper assembly includes a wiping element adapted to contact the surface to be wiped and at least one elongated spline acting to support the wiping element. A coupler is operatively attached to the spline and an adapter is pivotally attached to the coupler. The adapter has a body with a first end and a second end. A stop wall is formed adjacent to the first end of the body for abutting at least a portion of the track of the attachment member of the wiper arm. A pair of outer walls extend longitudinally between the first end and the second end. A strap connects the outer walls for engaging the base of the attachment member of the wiper arm. A pair of inner walls are spaced laterally between the outer walls and are arranged at least partially under the strap. A cantilevered finger extends longitudinally from each of the inner walls with a locking tab formed adjacent to the second end. The locking tabs extend laterally away from each other and are arranged so as to respectively engage the fins of the attachment member so as to prevent longitudinal movement between the adapter and the attachment member when the stop wall abuts the track of the attachment member.

Further, the present invention is directed toward an adapter for use in releasably attaching a wiper assembly to first and second wiper arm attachment member types. The first attachment member type includes a track defined by a base and walls depending therefrom, a bent tab extending outwardly from the base, and fins that extend from the walls. The second attachment member type extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The adapter has a body with a first end and a second end. A stop wall is formed adjacent to the first end of the body for abutting at least a portion of: the track of the first attachment member type, or the terminal end of the second attachment member type. A pair of outer walls extend longitudinally between the first end and the second end. A strap connects the outer walls for engaging: the base of the first attachment member type, or the upper wall of the second attachment member type. A pair of inner walls are spaced laterally between the outer walls and are arranged at least partially under the strap. A cantilevered finger extends longitudinally from each of the inner walls with a locking tab formed adjacent to the second end. The locking tabs extend laterally away from each other and arranged so as to respectively engage the fins of the first attachment member type so as to prevent longitudinal movement between the adapter and the first attachment member type when the stop wall abuts the track of the first attachment member type. A resilient finger is operatively attached to the body between the inner walls. The resilient finger has a tooth for engaging the aperture of the second attachment member type so as to prevent longitudinal movement between the adapter and the second attachment member type when the stop wall abuts the terminal end of the second attachment member type. At least one brace is formed on the body at the first end for being received in one of the cutouts of the second attachment member type when the tooth of the resilient finger engages the aperture of the second attachment member type wherein the brace at least partially abuts the lower cutout edge of the second attachment member type and remains spaced from the upper cutout edge of the second attachment member type.

In addition, the present invention is directed toward a wiper assembly for use in releasably attaching to first and second wiper arm attachment member types. The first attachment member type includes a track defined by a base and walls depending therefrom, a bent tab extending outwardly from the base, and fins that extend from the walls. The second attachment member type extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The wiper assembly includes a wiping element adapted to contact the surface to be wiped and at least one elongated spline acting to support the wiping element. A coupler is operatively attached to the spline and an adapter is pivotally attached to the coupler. The adapter has a body with a first end and a second end. A stop wall is formed adjacent to the first end of the body for abutting at least a portion of: the track of the first attachment member type, or the terminal end of the second attachment member type. A pair of outer walls extend longitudinally between the first end and the second end. A strap connects the outer walls for engaging: the base of the first attachment member type, or the upper wall of the second attachment member type. A pair of inner walls are spaced laterally between the outer walls and are arranged at least partially under the strap. A cantilevered finger extends longitudinally from each of the inner walls with a locking tab formed adjacent to the second end. The locking tabs extend laterally away from each other and arranged so as to respectively engage the fins of the first attachment member type so as to prevent longitudinal movement between the adapter and the first attachment member type when the stop wall abuts the track of the first attachment member type. A resilient finger is operatively attached to the body between the inner walls. The resilient finger has a tooth for engaging the aperture of the second attachment member type so as to prevent longitudinal movement between the adapter and the second attachment member type when the stop wall abuts the terminal end of the second attachment member type. At least one brace is formed on the body at the first end for being received in one of the cutouts of the second attachment member type when the tooth of the resilient finger engages the aperture of the second attachment member type wherein the brace at least partially abuts the lower cutout edge of the second attachment member type and remains spaced from the upper cutout edge of the second attachment member type.

In this way, the adapter and wiper assembly of the present invention cooperate to effectively clean a surface to be wiped and, at the same time, provide simple releasable attachment to the wiper arm attachment member. Further, the adapter and wiper assembly of the present invention provide advantages related to usability, manufacturing, component assembly, and performance in use.

BRIEF DESCRIPTION OF THE DRAWINGS

Other objects, features, and advantages of the present invention will be readily appreciated as the same becomes better understood after reading the subsequent description taken in connection with the accompanying drawings wherein:

FIG. 7A is a perspective view of a first attachment member type of a wiper arm to which the adapter of FIGS. 2-6 is configured for releasable attachment to.

FIG. 7B is a rotated perspective view of the first attachment member type of FIG. 7A.

FIG. 8A is an enlarged partial left-side view of the adapter of FIGS. 2-6 aligned in a pre-assembly configuration with the first attachment member type of FIGS. 7A-7B.

FIG. 8B is an enlarged partial left-side view of the adapter and the first attachment member type of FIG. 8A shown in a partially-assembled configuration.

FIG. 8C is an enlarged partial left-side view of the adapter and the first attachment member type of FIG. 8A shown in a fully-assembled configuration.

FIG. 9A is a partial top-side view of the adapter and the first attachment member type of FIG. 8C shown in the fully-assembled configuration.

FIG. 9B is a partial bottom-side view of the adapter and the first attachment member type of FIG. 9A shown in the fully-assembled configuration.

FIG. 14A is a perspective view of a second attachment member type to which the adapter of FIGS. 11-13 is configured for releasable attachment to.

FIG. 14B is a rotated perspective view of the second attachment member type of FIG. 14A, with portions of the second attachment member type shown in phantom.

DETAILED DESCRIPTION OF THE INVENTION

Figure 1:
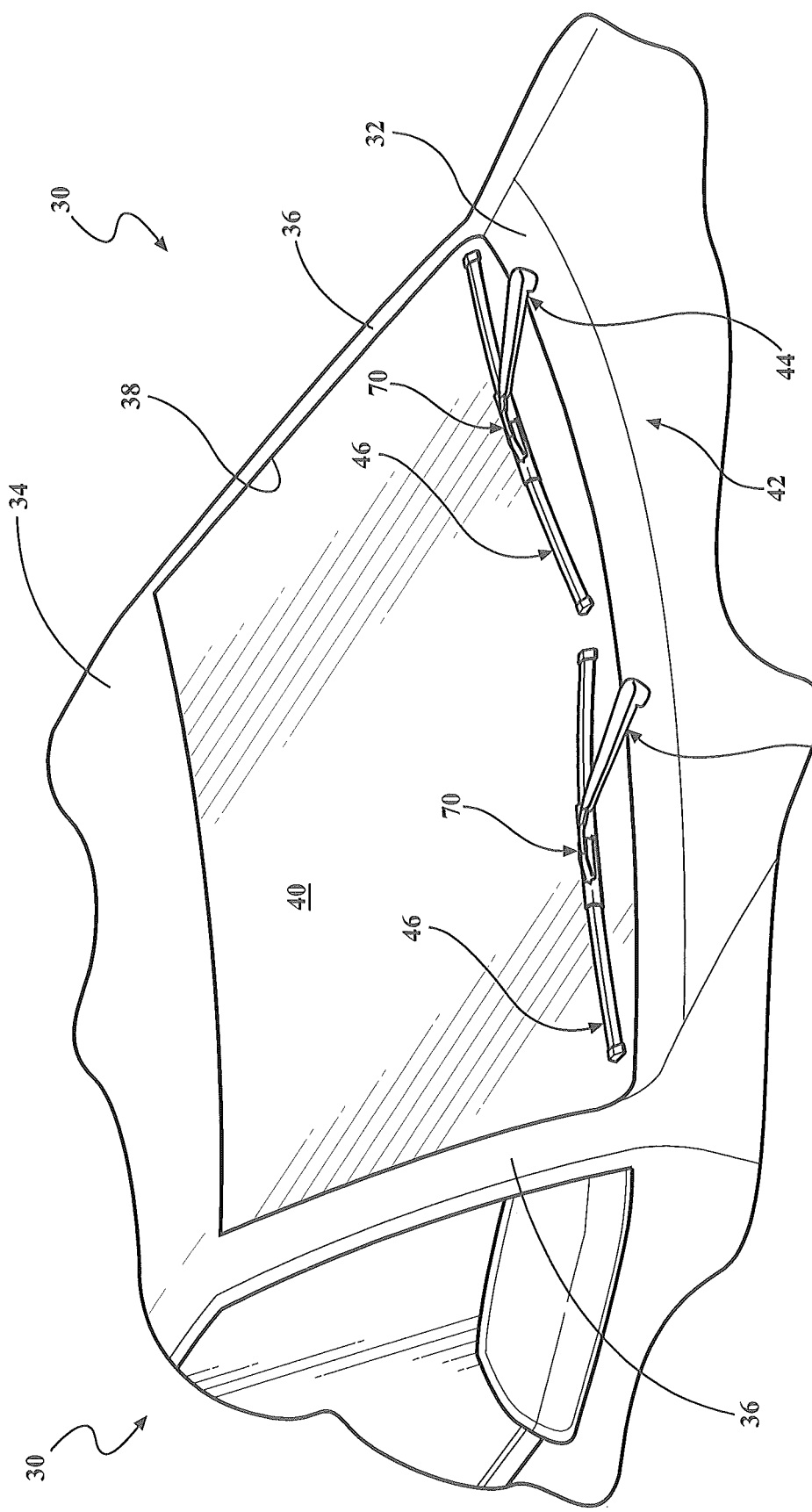
FIG. 1 is a partial perspective view of a front of a vehicle having a pair of wiper assemblies pivotally mounted to respective wiper arms for reciprocal movement across a windshield of the vehicle.

With reference to the Figures, where like numerals are used to designate like structure throughout the several views, a portion of a vehicle is schematically illustrated at 30 in FIG. 1. The vehicle 30 includes a cowl 32, a roof 34, and a pair of laterally spaced front A-pillars 36 extending between the roof 34 and the cowl 32. The A-pillars 36, roof 34, and cowl 32 cooperate to define a generally rectangular opening 38 in which a curved or "swept back" glass windshield 40 is supported. As illustrated, the vehicle 30 is an automobile, but could be any type of vehicle, such as a heavy-duty truck, train, airplane, ship, construction vehicle or equipment, military vehicle, or any other type of vehicle that contains surface wiper systems.

A wiper system is generally indicated at 42 in FIG. 1 and is employed to clean the windshield 40. The wiper system 42 includes a pair of wiper arms, generally indicated at 44, and a pair of wiper assemblies, generally indicated at 46, which correspond to the driver and passenger sides of the vehicle 30. However, those having ordinary skill in the art will appreciate that the wiper system 42 could employ a single wiper arm 44 and a single wiper assembly 46, or more than two wiper arms 44 and more than two wiper assemblies 46, without departing from the scope of the present invention. In the representative example illustrated herein, each wiper assembly 46 is carried by a corresponding wiper arm 44. The wiper system 42 also typically includes at least one electric motor and a linkage (not shown, but generally known in the art) to move the wiper assemblies 46 in an oscillating manner across the surface of the windshield 40.

While the wiper assembly 46 illustrated in FIG. 1 is shown in connection with the front windshield 40 of the vehicle 30, those having ordinary skill in the art will appreciate that wiper assemblies 46 could be used in other areas of the vehicle 30 that employ a wiper system 42, such as a rear window (not shown) or a head lamp (not shown). Thus, it will be understood that the present invention is not limited for use solely in connection with wiper arms 44 adapted for use on a vehicle's windshield 40, but for use in all applications where wiper systems 32 are employed.

Figure 2:
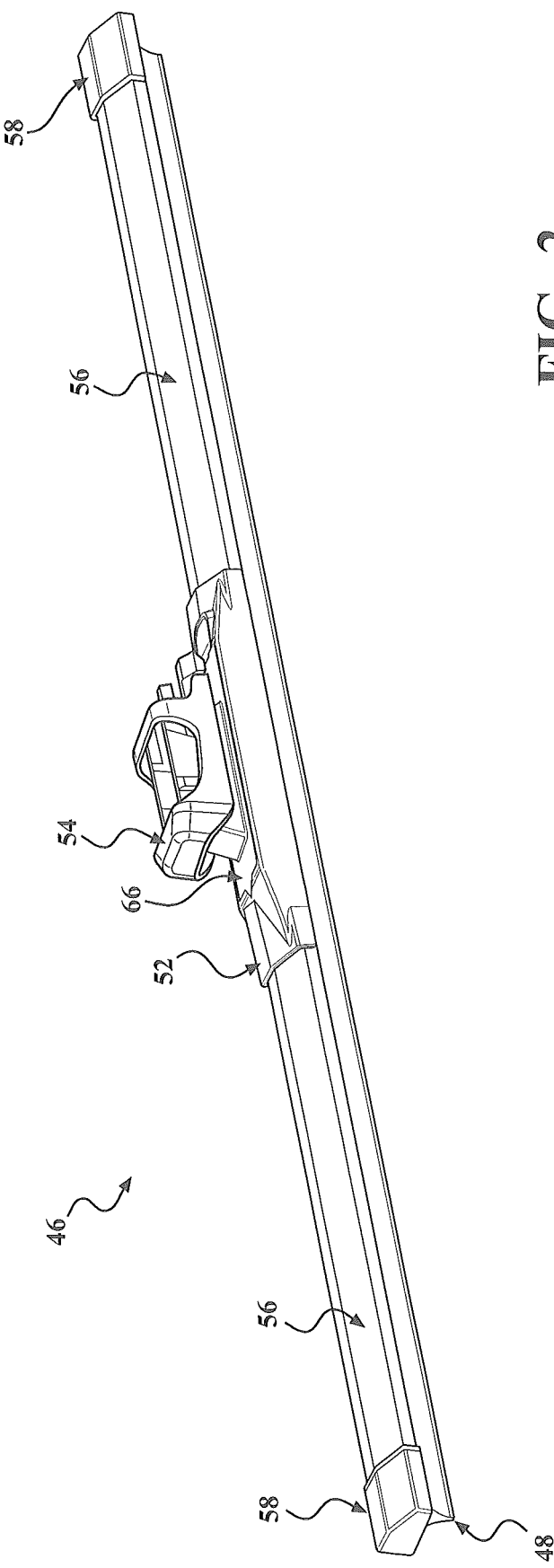
FIG. 2 is an enlarged perspective view of a wiper assembly having a coupler and an adapter pivotally mounted to the coupler according to one embodiment of the present invention.
Figure 3:
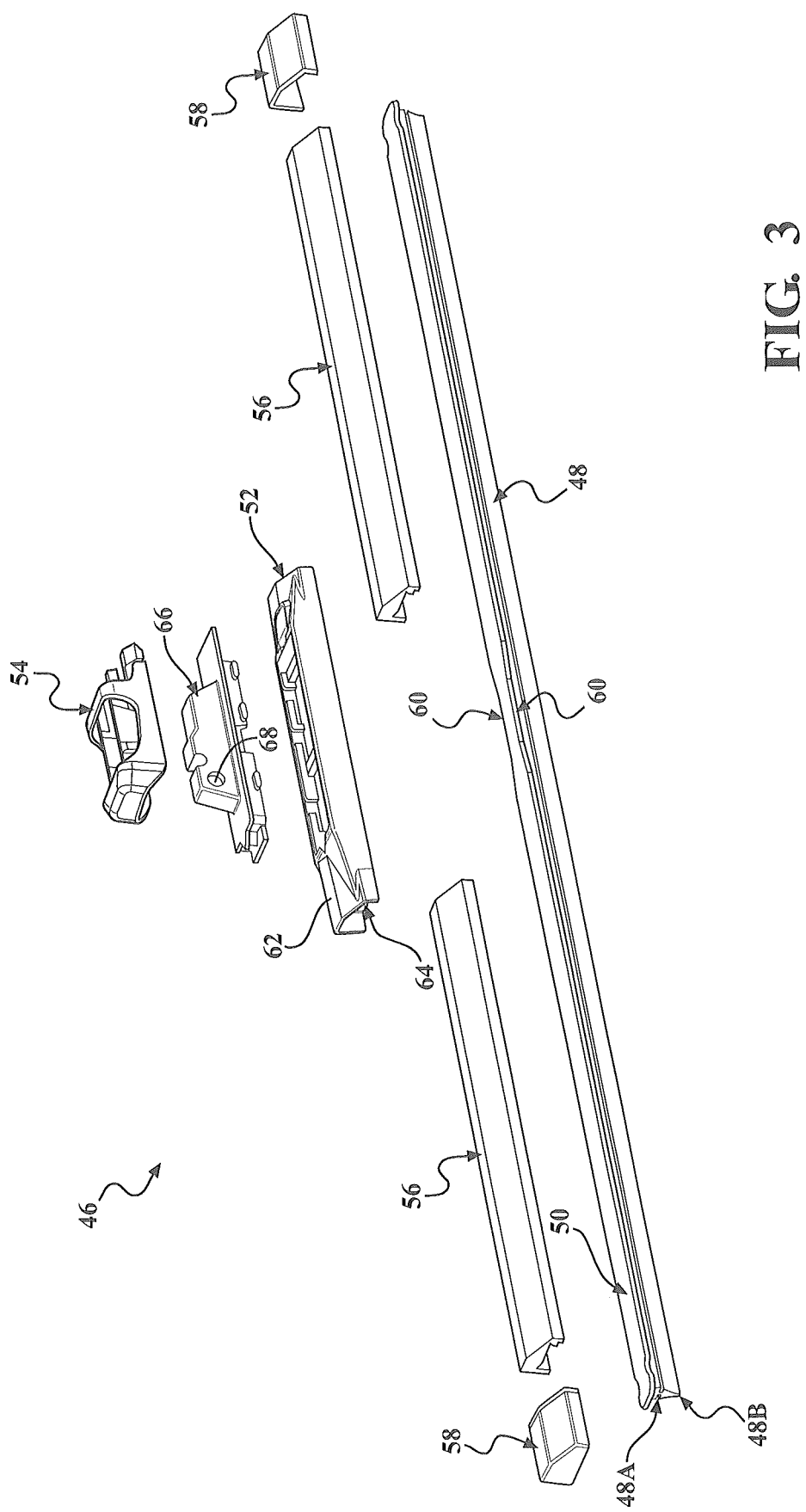
FIG. 3 is an exploded perspective view of the wiper assembly of FIG. 2.

Referring now to FIGS. 2 and 3, the wiper assembly 46 includes a wiping element 48 that is adapted to contact a surface of the vehicle 30 to be wiped, in this representative example, the windshield 40. The wiper assembly 46 also includes at least one support member 50 that defines a longitudinal axis and that acts to reinforce or support the wiping element 48. In the representative embodiment illustrated herein, the support member 50 is a monolithic beam mounted directly to the wiping element 48, as described in greater detail below. However, those having ordinary skill in the art will appreciate from the description that follows that the support member 50 could be either monolithic or defined by a pair of splines (not shown, but generally known in the art) without departing from the scope of the present invention. The wiper assembly 46 also includes a coupler 52 operatively attached to the support member 50. As is described in detail below, the coupler 52 is configured to attach to an adapter 54 which, in turn, is adapted to connect the wiper assembly 46 to the wiper arm 44. The wiper assembly 46 may also include an airfoil assembly, generally indicated at 56, to prevent the wiper assembly 46 from lifting away from the surface of the windshield 40. The wiper assembly 46 may still further include one or more end caps, generally indicated at 58, to prevent the airfoil assembly 56 from disengaging the support member 50. Each of these components will be described in greater detail below.

The wiping element 48 is configured to a predetermined length corresponding to a particular application, and is often manufactured through an extrusion process which enables the length of the wiping element 48 to be easily adjusted without a substantial increase in manufacturing expense. While the wiping element 48 is constructed from a flexible rubber, those having ordinary skill in the art will appreciate that the wiping element 48 could be constructed from any flexible material, such as silicone or another polymer, without departing from the scope of the present invention. The wiping element 48 typically includes head portion 48A and a wiping portion 48B (see FIG. 3). The head portion 48A is operatively attached to the monolithic support member 50 with an adhesive, such as glue (not shown, but generally known in the art). However, it will be appreciated that wiping element 48 could be operatively attached to the support member 50 in any suitable way without departing from the scope of the present invention. The wiping portion 48B of the wiping element 48 is adapted to contact the surface to be wiped 40. As shown in FIG. 3, the wiping portion 48B has a generally triangular, tapered profile. However, those having ordinary skill in the art will appreciate that the wiping portion 48B could have any suitable profile, shape, or configuration without departing from the scope of the present invention.

As noted above, the support member 50 is glued to the wiping element 48. Those having ordinary skill in the art will recognize this as a monolithic "beam blade" configuration. However, it will be appreciated that the wiping element 48 could be supported by or receive force distribution from different types and styles of support members 50 in different ways without departing from the scope of the present invention. By way of non-limiting example, in a so-called "twin-rail beam blade", the support member 50 is realized as a pair of splines supported in opposing grooves (not shown, but generally known in the art) extending laterally in and longitudinally along the wiping element 48 between its longitudinal end. Moreover, it will be appreciated that the wiper assembly 46 could employ one or more carriers (not shown, but generally known in the art) interposed between the support member 50 and wiping element 48 such that the support member 50 does not directly engage the wiping element 48.

The support member 50 may be constructed from a resiliently flexible material, such as spring steel or a polymer, and is adapted to apply force from an intermediate position between its longitudinal ends. More specifically, the support member 50 receives force from the spring loaded wiper arm 44 at an intermediate position and distributes this force across the span of the support member 50 toward its longitudinal ends. To that end, the support member 50 may be curved longitudinally with a predetermined radius of curvature. In the related art, this predetermined radius of curvature is sometimes referred to as a "free form" radius of curvature. Accordingly, the curvature of the support member 50 may be symmetrical or asymmetrical, depending on the force requirements of the application and the contour of the windshield 40. The flexible, free form, pre-curved support member 50 straightens out when the wiper arm 44 applies a force thereto to flatten the support member 50, and directs the wiping element 48 to contact the windshield 40. Thus, the elongated support member 50 includes a free-form curvature that ensures force distribution on windshields having various curvatures and that effects proper wrapping about the windshield 40.

As illustrated in FIG. 3, the support member 50 may have a substantially constant width and a constant thickness throughout the length between the longitudinal ends of the support member 50. The constant width and thickness are adapted to provide high lateral and torsional stiffness so as to avoid lateral and torsional deflections, which cause the wiping element 48 to stick/slip ("chatter") on the windshield 40 during operation. Thus, the cross-section of the support member 50 has a generally rectangular outer profile that makes the support member 50 easier to manufacture. More specifically, where the support member 50 is constructed from metal, such as spring steel, the tools and machinery used to manufacture the support member 50 are less complicated than that required to manufacture one having varying widths and/or thickness. Furthermore, where the support member 50 is constructed from a polymer, such as a thermoplastic elastomer, the tools and extrusion process machinery are also less complicated than those employed to manufacture varying widths and/or thicknesses. However, those having ordinary skill in the art will appreciate that the support member 50 illustrated herein may include a varying thickness and/or width without departing from the scope of the present invention. Further, as mentioned above, those having ordinary skill in the art will appreciate that the support member 50 could be monolithic or a plurality of splines.

The support member 50 may include one or more notches (not shown in detail) located near the longitudinal ends of the support member 50, which are generally trapezoidal or rectangular in shape, but may be any shape suitable to cooperate with the end caps 58 so as to retain the end caps 58 to the support member 50. Additionally, the support member 50 may include one or more securing features 60 for cooperating with the coupler 52 to operatively attach the support member 50 to the coupler 52. In the embodiment illustrated in FIG. 3, the securing feature 60 is realized as a tapered "hourglass" region formed so as to cooperate with the coupler 52 to the support member 50 to the coupler 52. However, those having ordinary skill in the art will appreciate that the securing features 60 could be of any suitable shape or configuration, or could be omitted entirely, without departing from the scope of the present invention. Specifically, those having ordinary skill in the art will appreciate that the coupler 52 could be fixed to the support member 50 in several different ways. By way of non-limiting example, the coupler 52 could be glued, welded, crimped, bolted, riveted, formed-over, locked, or otherwise fixed to the support member 50 without departing from the scope of the present invention As noted above, the wiper assembly 46 also typically includes at least one airfoil assembly 56 operatively mounted to the support member 50. The airfoil assembly 56 extends substantially along the length of the wiper assembly 46 and acts to reduce the likelihood of wind lift by allowing air to flow over the wiper assembly 46. More specifically, and in the embodiment illustrated herein, the airfoil assembly 56 is formed as two individual components operatively mounted to the support member 50, with the coupler 52 disposed between the airfoils 56. However, those having ordinary skill in the art will appreciate that the airfoil assembly 56 could be formed as any suitable number of individual components without departing from the scope of the present invention. By way of non-limiting example, the airfoil assembly 56 could be defined by a single unitary component, could be integrated with the wiping element 48, or could be omitted entirely.

While the wiper assembly 46 depicted in FIGS. 2 and 3 includes airfoils 56 with asymmetric, angled profiles that extend along a substantially constant cross-section, those having ordinary skill in the art will appreciate that the airfoils 56 could be formed differently without departing from the scope of the present invention. The airfoil assembly 56 is configured to a predetermined length corresponding to a particular application, and may be manufactured by an extrusion process. However, those having ordinary skill in the art will appreciate that the airfoil assembly 56 could be constructed in other ways, such as by an injection molding, without departing from the scope of the present invention. Moreover, those having ordinary skill in the art will appreciate that manufacturing by extrusion enables the length of the airfoil assembly 56 to be easily adjusted without a substantial increase in manufacturing expense. Further still, while the airfoil assembly 56 is constructed from plastic, those having ordinary skill in the art will appreciate that the airfoil assembly 56 could be constructed from any suitable material without departing from the scope of the present invention. Moreover, while the airfoil assembly 56 is extruded from a single material, those having ordinary skill in the art will appreciate that the airfoil assembly 56 could be formed from a plurality of materials, such as by co-extrusion, over-molding, skin coating, etc., without departing from the scope of the present invention.

As illustrated in FIGS. 2 and 3 and as noted above, the wiper assembly 46 includes a pair of end caps, generally indicated at 58, which are adapted to be disposed adjacent to the distal longitudinal ends of the support member 50. The end caps 58 are secured to the support member 50 and may have a profile that substantially mimics the contours of the airfoil assembly 56 so as to maintain the wind lift characteristics of the wiper assembly 46 and to provide an increased aesthetic value. The end caps 58 also provide a mass increase adjacent to the distal ends of the support member 50 that helps prevent localized chatter along the extremities of the wiping element 48 caused by a combination of wind lift and a decrease in the force distributed to this area from the wiper arm 44 via the support member 50, as described above. It will be appreciated that the end caps 58 may include a locking arm (not shown, but generally known in the art) or other features that engage notches (not shown in detail) formed in the support member 50 so as to secure the end caps 58 thereto.

As previously noted, in one embodiment of the present invention, the wiper assembly 46 includes a coupler 52 operatively attached to the support member 50. As illustrated in FIGS. 2 and 3, the coupler 52 has a base 62 with claws 64 (not shown in detail, but generally known in the art) to attach to the support member 50. In the embodiment illustrated herein, the coupler 52 is a unitary, one piece component. However, those having ordinary skill in the art will appreciate that the coupler 52 could be designed as a plurality of components that interlock or otherwise cooperate to operatively attach to the support member 50, without departing from the scope of the present invention. The coupler 52 is typically constructed from plastic and is formed using an injection molding process. However, those having ordinary skill in the art will appreciate that the coupler 52 could be constructed from any suitable material formed using any suitable process without departing from the scope of the present invention.

As noted above, the coupler 52 is configured to secure the adapter 54 which, in turn, is configured to releasably attach to the wiper arm 44. In the representative embodiment illustrated herein, the base 62 of the coupler 52 is configured to releasably secure a saddle, generally indicated at 66, interposed between the coupler 52 and the adapter 54. The saddle 66 includes opposing cylindrical recesses 68 configured to pivotally engage the adapter 54 to facilitate improved connection to the wiper arm 44, as is discussed more thoroughly below. However, those having ordinary skill in the art will appreciate that the coupler 52 could be connected to the adapter 54 in any suitable way without departing from the scope of the present invention. By way of non-limiting example, the adapter 54 could be pivotally coupled directly to the coupler 52 without the use of the saddle 66. However, it will be appreciated that the interposition of the saddle 66 between the adapter 54 and the coupler 52 enables the wiper assembly 46 to be fitted with an increased number of different styles of adapters 54 and respective saddles 66, so as to releasably engage correspondingly different styles or configurations of wiper arms 44. The Applicant has described the specific configuration and structure of the coupler 52 and saddle 66 illustrated throughout the figures in published U.S. patent application Ser. No. 13/677,423, the contents of which are hereby incorporated by reference.

As mentioned above, the adapter 54 of the present invention is configured to be operatively attached to a wiper assembly 46. In one embodiment, the adapter 54 is pivotally attached to the saddle 66 which, in turn, is attached to the coupler 52. In general, adapters 54 are employed to releasably attach the wiper assembly 46 to one or more types of wiper arms 44. Those having ordinary skill in the art will appreciate that different OEM's employ wiper arms 44 configured to releasably attach to different adapters 54 which are, in turn, operatively attached to a specific wiper assembly 46. By way of example, certain wiper arm 44 types employed by OEM's include "bayonet-style"; "pin-type"; "hook-type"; "push-button"; "pinch-tab"; "top-lock"; or "side-pin" connection systems of various sizes. As such, it will be appreciated that wiper arms 44 can generally be connected to wiper assemblies 46 in a number of different ways, using different sizes and styles of connection systems. Depending on the application, the wiper assembly 46 may be packaged and sold with a plurality of adapters 54 configured to attach to a correspondingly different wiper arms 44, particularly where the wiper assembly 46 is designed for sale in the aftermarket. As such, it will be appreciated that the specific configuration of the adapter 54 may vary to accommodate different type(s) of wiper arms 44.

As noted above, the adapter 54 is configured to releasably attach to the wiper arm 44. Specifically, the various embodiments of the adapter 54 of the present invention are configured to releasably attach the wiper assembly 46 to a wiper arm 44 having a specific type of attachment member 70, which is described more thoroughly below. Typically, the attachment member 70 is formed separately from the wiper arm 44 and is then operatively attached thereto, such as by crimping or welding. However, those having ordinary skill in the art will appreciate that the attachment member 70 could also be formed integrally with the wiper arm 44.

Referring now to FIGS. 7A and 7B, a first attachment member type 70A is shown. The first attachment member type 70A includes a track, generally indicated at 72, that is defined by a base 74 and a pair of walls 76 depending therefrom. The track 72 extends to a track end 78, from which a bent tab 80 extends outwardly. The bent tab 80 may also include a tab hole 82 disposed therein. The first attachment member type 70A also includes a pair of fins 84 that each extend to respective fin ends 86. As shown in FIGS. 7A and 7B, the fins 84 merge with or are otherwise formed as a part of the walls 76 of the track 72. Those having ordinary skill in the art will appreciate from the discussion that follows that neither the wiper arm 44 nor the first attachment member type 70A described above form part of the present invention.

One example of the first attachment member type 70A described above is what is sometimes referred to in the art as a "pinch tab" wiper arm. Such a "pinch tab" wiper arm is described in U.S. Pat. Nos. 7,891,044 and 7,937,798, which teach connecting the "pinch tab" wiper arm to a wiper blade using what is known in the related art as a "toe-to-heel" method. Those having ordinary skill in the art will appreciate that the "toe-to-heel" method is unsatisfactory in that it necessitates positioning the "pinch tab" wiper arm and wiper awkwardly to effect attachment. In particular, and in certain automotive applications, achieving the necessary positioning is significantly difficult, or even impossible, due to the relative positions of the arms 44 and the cowl 32 of the vehicle 30. By way of example, certain vehicles 30 are designed such that the wiper arms 44 are covered by a portion of the cowl 32. Thus, as will be appreciated from the description of the adapters 54 below, the present invention is, in part, directed toward effecting attachment with a "pinch tab" wiper arm using a linear installation methodology at advantageously improved relative positioning, thereby enabling a significantly broader range of positions to be used during attachment of the wiper assembly 46.

As noted above, the adapter 54 of the present invention is configured to releasably secure to the first attachment member type 70A depicted in FIGS. 7A-7B in a linear fashion and without pivoting. As is described in greater detail below in connection with FIGS. 11-20, in one embodiment of the present invention, the adapter 54 is additionally configured to attach to a second attachment member type 70B, which is depicted in FIGS. 14A-14B. Here, the second attachment member type 70B extends to a terminal end 88 with an upper wall 90 and a pair of side walls 92 depending from the upper wall 90. Here, the terminal end 88 is defined by a front edge 88A of the upper wall 90 and curved edges 88B of the side walls 92 (see FIG. 14A). The side walls 92 each have an inwardly-extending protrusion 94. The protrusions 94 face each other, have a substantially rounded-rectangular profile, and are spaced longitudinally from the terminal end 88. The side walls 92 also each have a U-shaped cutout 96 formed at the terminal end 88. The cutouts 96 are formed transversely through the side walls 92 and each defines an upper cutout edge 98, a lower cutout edge 100 spaced vertically below the upper cutout edge 98, and a curve cutout edge 102 which connects the upper cutout edge 98 and the lower cutout edge 100 and which faces the terminal end 88. The attachment member 58 also has an aperture 104 formed in the upper wall 64. The aperture 104 has a rounded-rectangular profile and is spaced vertically above the protrusions 94 and longitudinally from the terminal end 88. In FIG. 14B, the aperture 104 and portions of the protrusions 94 are shown in phantom. Those having ordinary skill in the art will appreciate from the discussion that follows that neither the wiper arm 44 nor the second attachment member type 70B described above form part of the present invention.

Referring now to FIGS. 4-6 and 8A-10, one embodiment of the adapter 54 of the present invention is shown. As noted above, the adapter 54 is configured to releasably secure to the first attachment member type 70A illustrated in FIGS. 7A-7B. To that end, the adapter 54 includes a body, generally indicated at 106, that has a first end 108 and a second end 110. A stop wall, generally indicated at 112, is formed on the body 106 adjacent to the first end 108 for abutting at least a portion of the track 72 of the first attachment member type 70A. A pair of outer walls 114 extend longitudinally between the first end 108 and the second end 110. A strap 116 connects the outer walls 114 and is arranged to engage the base 74 of the first attachment member type 70A. A pair of inner walls 118 are spaced laterally between the outer walls 114 and are arranged at least partially under the strap 116. A cantilevered finger 120 extends longitudinally from each of the inner walls 118. Each cantilevered finger 120 has a locking tab 122 formed adjacent to the second end 110. The locking tabs 122 extend laterally away from each other and are arranged so as to respectively engage one of the fins 84 of the first attachment member type 70A so as to prevent longitudinal movement between the adapter 54 and the first attachment member type 70A when the stop wall 112 abuts the track 72 of the first attachment member type 70A. Each of the above components will be described in greater detail below.

Figure 10:
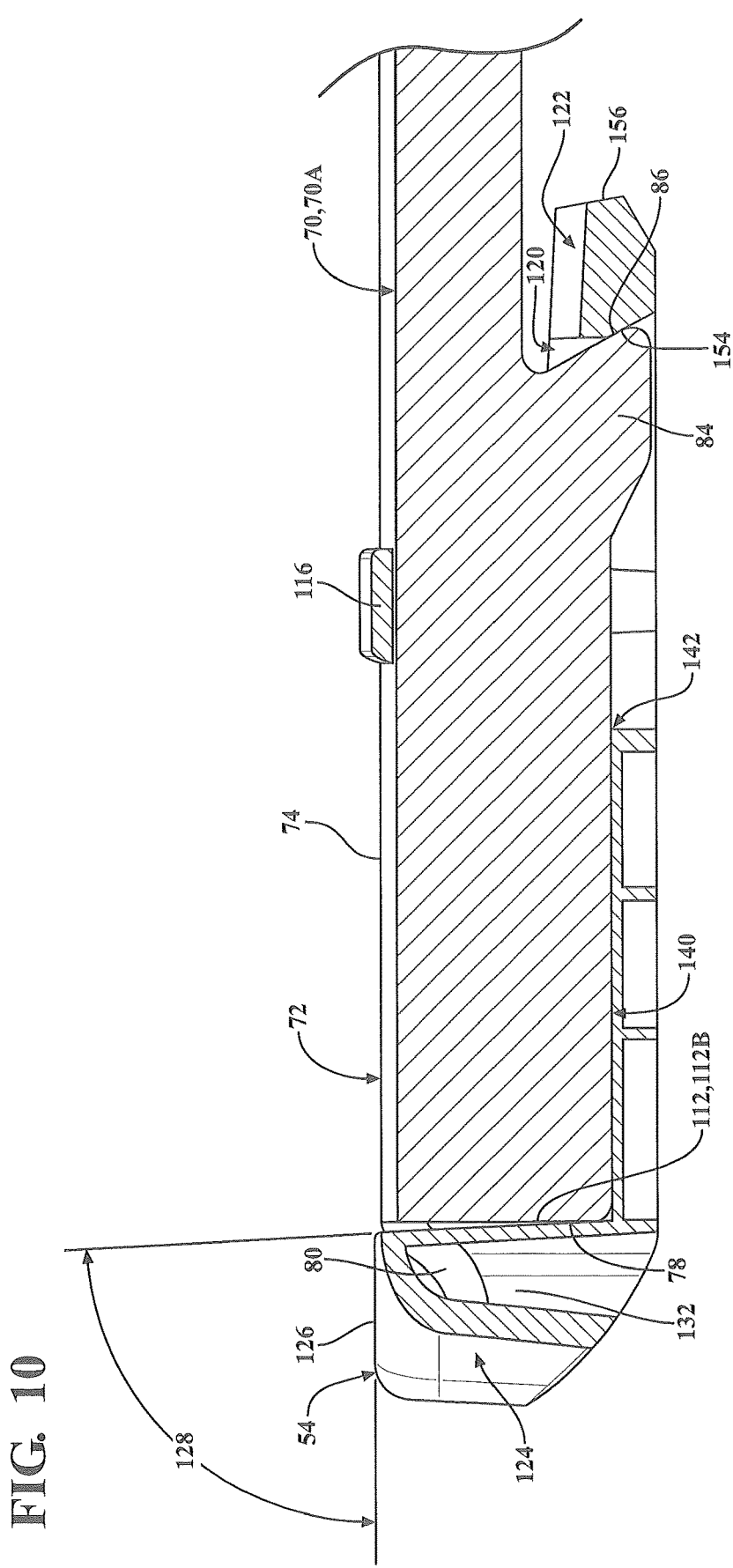
FIG. 10 is a sectional view taken along line 10-10 of FIG. 9A, showing the adapter and the first attachment member type secured in the fully-assembled configuration.

In one embodiment, the adapter 54 includes a nose, generally indicated at 124, formed on the body 106 at the first end 108. The nose 124 extends between and merges with the outer walls 114, and has a tapered profile. As shown best in FIG. 5, the nose 124 has an outer top surface 126 which merges with the outer walls 114 and the stop wall 112. Here, the stop wall 112 extends laterally between the outer walls 114 at an angle 128 defined with respect to the outer top surface 126 (see FIG. 10). As shown best in FIG. 10, the stop wall 112 has a substantially flat profile and the angle 128 is less than 90 degrees, but it will be appreciated that the stop wall 112 could have any suitable profile, shape, or configuration, arranged in any suitable way or location and at any suitable angle 128, without departing from the scope of the present invention. With reference again to FIG. 5, in the representative embodiment illustrated herein, a knock 130 is formed in the stop wall 112 at least partially between the inner walls 118. Here, the knock 130 has a downwardly-opening U-shaped profile and is configured to accommodate the bent tab 80 of the first attachment member type 70A. More specifically, the knock 130 formed in the stop wall 112 defines the stop wall 112 as an stop upper wall 112A and a pair of stop side walls 112B such that the bent tab 80 of the first attachment member type 70A can be received under the stop upper wall 112 and laterally between the stop side walls 112B when the adapter 54 is secured to the first attachment member type 70A. As shown in FIG. 10, the track end 78 of the walls 76 first attachment member type 70A abut lower portions of the stop side walls 112B when the adapter 54 is secured to the first attachment member type 70A. The nose 124 of the adapter 54 also has a chamber, generally indicated at 132, into which the knock 130 defined in the stop wall 112 is formed. The chamber 132 is provided for accommodating at least a portion of the bent tab 80 of the first attachment member type 70A.

Figure 4:
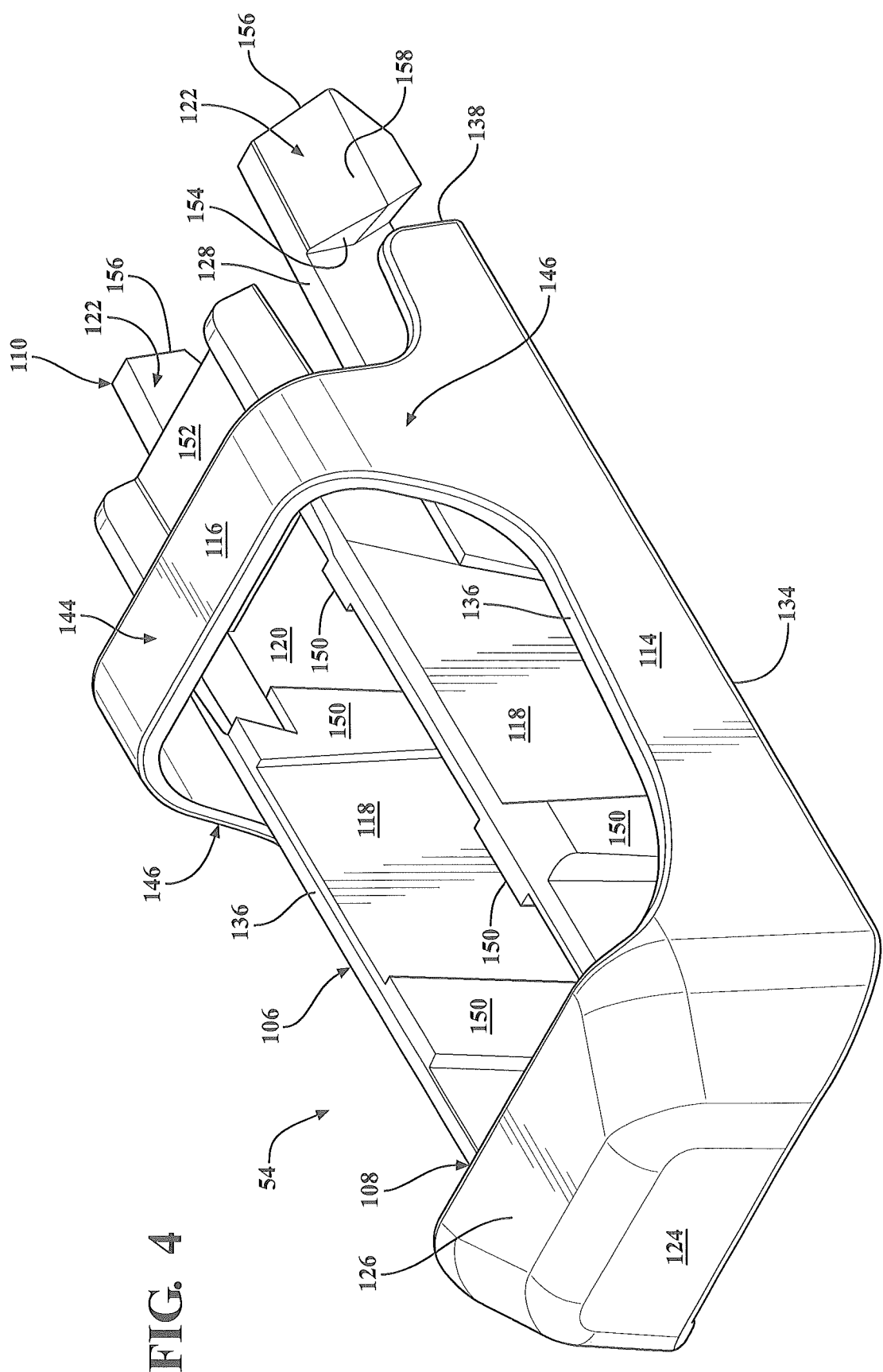
FIG. 4 is an enlarged perspective view of the adapter of FIGS. 2-3, according to one embodiment of the present invention.
Figure 5:
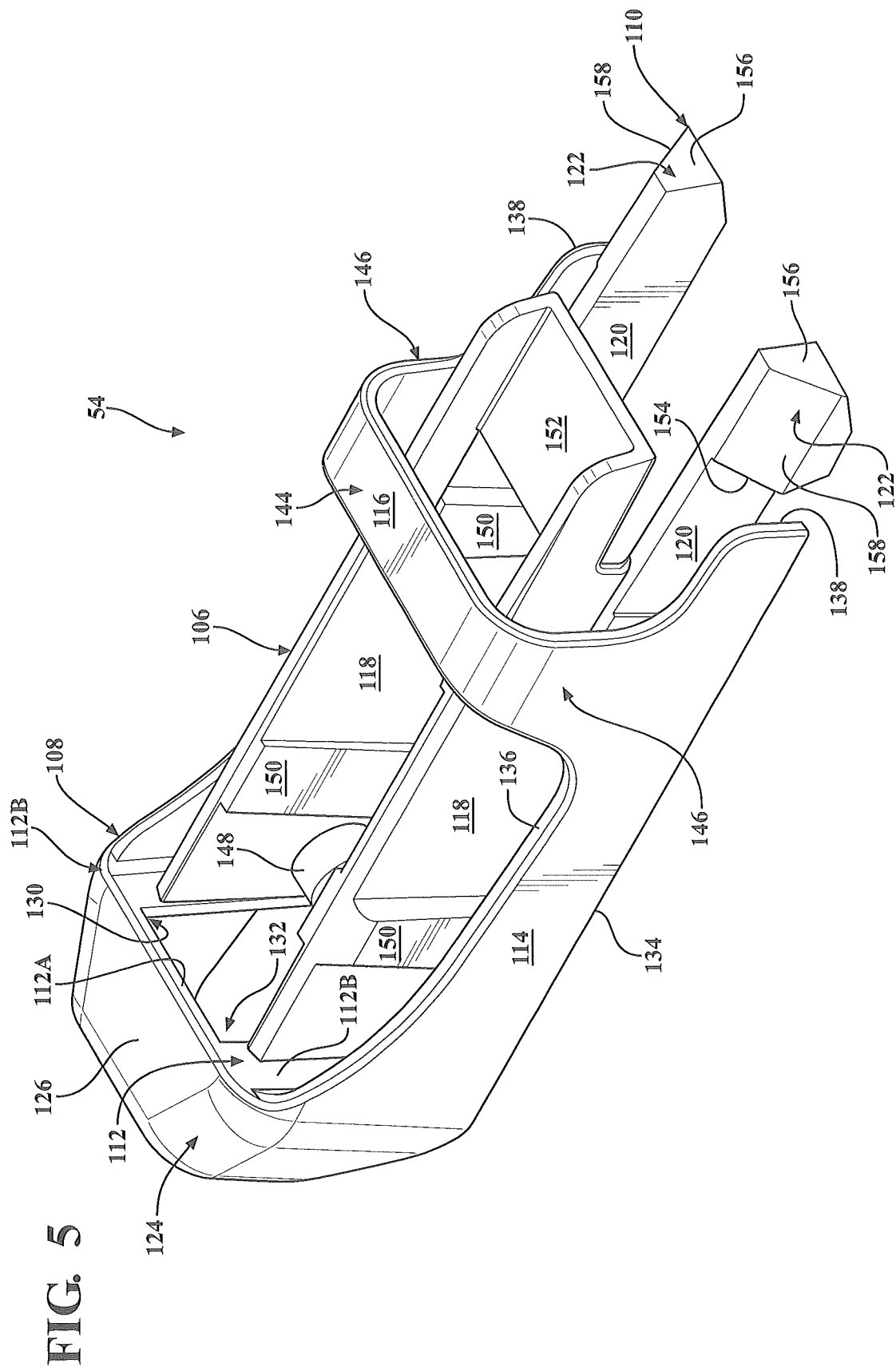
FIG. 5 is a rotated perspective view of the adapter of FIGS. 2-4.

As best shown in FIGS. 4 and 5, the outer walls 114 of the adapter 54 have a lower edge 134 extending longitudinally between the first end 108 and second end 110 of the body 106 of the adapter 54. Further, as is discussed in greater detail below, the outer walls 114 have an upper edge 136 spaced from the lower edge 134 that merges seamlessly with the nose 84 and the strap 116. However, those having ordinary skill in the art will appreciate that the lower edge 134 and the upper edge 136 of the outer walls 114 could have any suitable shape or configuration without departing from the scope of the present invention. Here, the outer walls 114 extend longitudinally to wall ends, generally indicated at 138, which are arranged adjacent to and spaced from the locking tabs 122 of the cantilevered fingers 120, with the strap 116 interposed longitudinally between the nose 124 and the wall ends 138. However, it will be appreciated that the strap 116 could extend to or otherwise form a portion of the wall ends 138 without departing from the scope of the present invention.

As is shown best in FIG. 10, in one embodiment, the adapter 54 includes a brace, generally indicated at 140, which extends laterally between each outer wall 114 and the adjacent inner wall 118. The braces 140 extend longitudinally from the stop side walls 112B to respective brace ends 142, and are configured to abut bottom edges of the walls 76 of the track 72 of the first attachment member type 70A. To that end, the brace ends 142 are interposed longitudinally between the nose 124 and the strap 116, and help facilitate smooth installation of the first attachment member type 70A into the adapter 54, as described in greater detail below.

Referring to FIGS. 4-6 and 8A-10, the strap 116 of the adapter 54 is configured to engage the base 74 of the first attachment member type 70A. In one embodiment, the strap 116 is spaced longitudinally along the body 106 of the adapter 54 such that it is between the nose 124 and the locking tabs 122. As illustrated throughout the drawings, the strap 116 has a middle section 144 and a pair of supports 146 depending therefrom (see FIGS. 4-6). The supports 146 have a tapered profile and merge the middle section 144 of the strap 116 with the outer walls 114. Those having ordinary skill in the art will appreciate that the middle section 144 and the supports 146 of the strap 116 could have any suitable shape, size, or configuration sufficient to engage the base 74 of the first attachment member type 70A, without departing from the scope of the present invention. Further, as best illustrated by FIG. 10, the middle section 144 of the strap 116 is spaced vertically above the outer top surface 126 of the nose 124. However, those having ordinary skill in the art will appreciate that the strap 116 and nose 124 could be spaced or configured differently without departing from the scope of the present invention.

As noted above, the adapter 54 is pivotally mounted to the saddle 66, which is secured to the coupler 52 which, in turn, is operatively attached to the support member 54. To effect pivoting, as shown best in FIG. 6, the adapter 54 includes a pair of inwardly-facing trunnions 148 formed at the first end 108 of the body 106. The trunnions 148 are integrally formed with the body 106, extend towards each other from the respective inner walls 118, and are configured to be disposed in the recesses 68 formed in the saddle 66 so as to effect pivoting of the adapter 54 mounted to the coupler 52. While the adapter 54 illustrated herein employs integrally-formed trunnions 148 positioned adjacent to the first end 108 of the body 106, those having ordinary skill in the art will appreciated that the adapter 54 could employ different structure and/or components to effect pivoting with respect to the coupler 52 without departing from the scope of the present invention. By way of non-limiting example, the arrangement of trunnions 148 and recesses 68 could be interchanged such that the saddle 66 and/or coupler 52 could be provided with trunnions and recesses could be formed in the adapter 54, or an additional component such as a pin could be employed to engage in corresponding bearing bores and/or knocks formed in the adapter 54 and/or the coupler 52.

Figure 6:
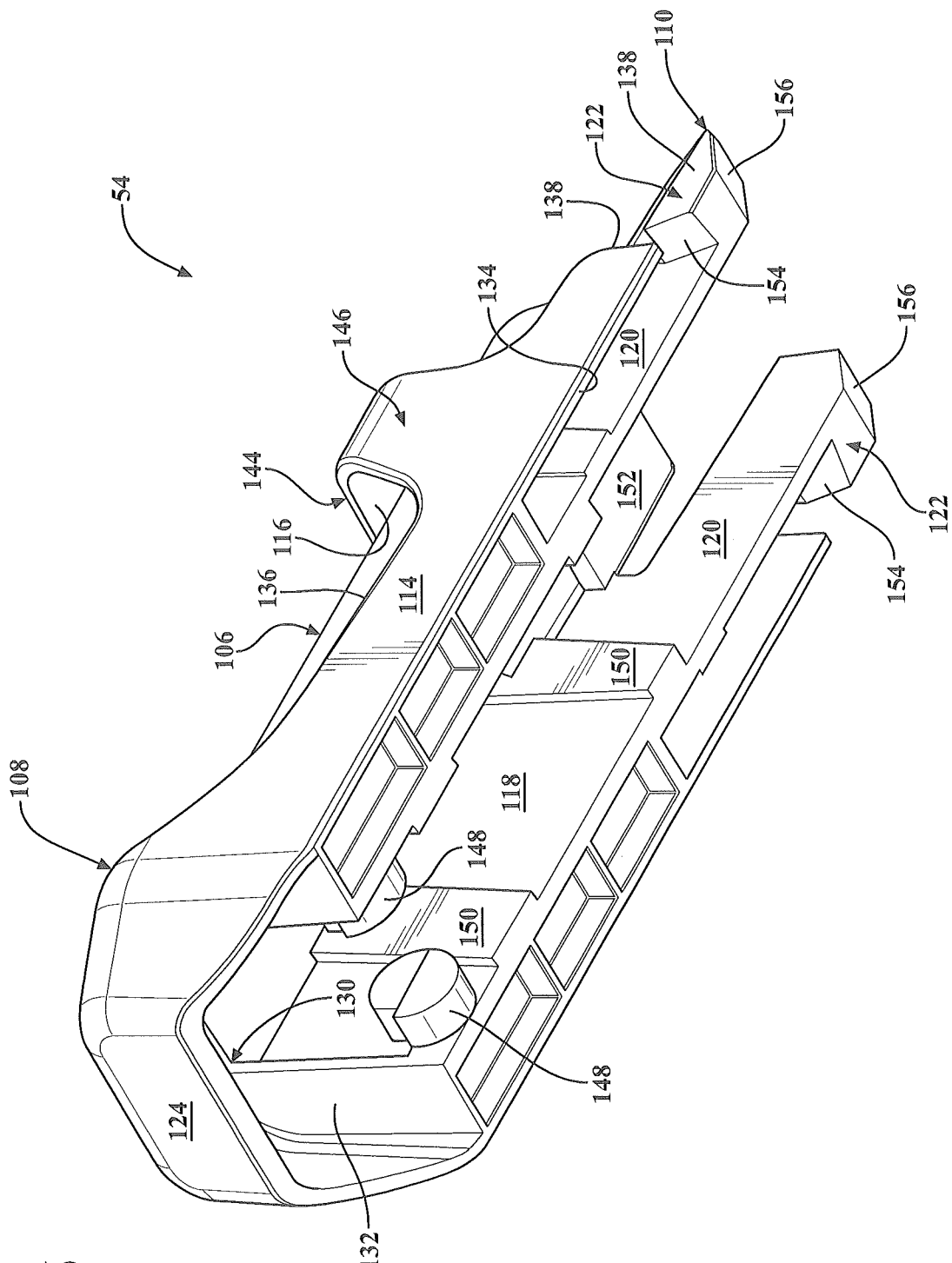
FIG. 6 is a rotated perspective view of the adapter of FIGS. 2-5.

In one embodiment, the adapter 54 includes at least one dampening formation 150 configured to at least partially engage a portion of the saddle 66 so as to effect rotation dampening between the adapter 54 and the coupler 52 in use (see FIGS. 4-6). It will be appreciated that the dampening formations 150 also provide rigidity to the body 106 of the adapter 54. As shown in FIG. 6, each of the inner walls 118 includes a respective pair of inwardly-extending dampening formations 150. Similarly, as shown in FIG. 5, each inner wall 118 also includes a pair of outwardly-extending dampening formation 150 arranged so as to guide the track 72 of the first attachment member type 70A into the adapter 54, as described in greater detail below. However, those having ordinary skill in the art will appreciate that the adapter 54 could employ any suitable number of dampening formations 150 configured in any suitable way, or could omit dampening formations 150 altogether, without departing from the scope of the present invention.

In one embodiment, the adapter 54 includes an alignment guide 152 extending from the inner walls 118 adjacent to the second end 110 of the body 106. The alignment guide 152 has an upwardly opening U-shaped profile (see FIG. 5). The alignment guide 152 cooperates with the bent tab 80 of the first attachment member type 70A such that the walls 76 of the first attachment member type 70A are aligned between the outer walls 114 of the adapter 54 and with respect to the inner walls 118 of the adapter 54 during attachment the first attachment member type 70A with the adapter 54. It will be appreciated that one or more additional alignment guides 152 could be included on the adapter 54 between the first and second ends 108, 110, such as disposed longitudinally between the nose 124 and the strap 116, for providing rigidity to the body 106 of the adapter 58 and for facilitating improved alignment during assembly.

As noted above, the adapter 54 includes a pair of cantilevered fingers 120 which each employ a locking tab 122 to secure to one of the fins 84 of the first attachment member type 70A. More specifically, in one embodiment, the locking tabs 122 each have a shoulder 154 for engaging the fin ends 86 of the fins 84, a distal tab end 156 spaced from the shoulder 154, and a tapered wall 158 extending between the shoulder 154 and the distal tab end 156 (see FIGS. 4-6). As shown best in FIG. 5, in the illustrated embodiment, the shoulders 154 extend laterally outwardly from each of the cantilevered fingers 120. It will be appreciated that the tapered walls 158 ease installation of the first attachment member type 70A to the adapter 54, whereby the cantilevered fingers 120 and locking tabs 122 can be displaced inwardly when the tapered walls 158 contacts the track 72 of the first attachment member type 70A, and whereby the cantilevered fingers 120 resiliently return outwardly once installation with the adapter 54 is complete, thereby bringing the shoulders 154 of the locking tabs 122 into engagement with the fin ends 86 of the fins 84 of the first attachment member type 70A so as to secure the adapter 54. While the locking tabs 122 illustrated throughout the drawings include a shoulder 154, distal tab end 156, and tapered wall 158 as described above, those having ordinary skill in the art will appreciate that the adapter 54 of the present invention could utilize any number of cantilevered fingers 120 and/or locking tabs 122 of any suitable configuration, size, or shape, disposed adjacent to the second end 110 of the body 106 of the adapter 54 and configured to engage at least one of the fins 84 of the first attachment member type 70A, without departing from the scope of the present invention. Further, the locking tabs 122 may include one or more additional chamfers, such as at the second end 110 of the body, aligned or otherwise arranged in any suitable way sufficient to facilitate urging the cantilevered fingers 120 towards each other in response to contact with the attachment member 70 during assembly.

Referring to FIGS. 8A-8C, the sequence of steps involved in securing the adapter 54 to the first attachment member type 70A are shown. In a pre-assembly configuration (see FIG. 8A), the adapter 54 is brought into close proximity with the first attachment member type 70A and is aligned with respect to the strap 116 and between the outer walls 114 before moving the adapter 54 longitudinally closer to the first attachment member type 70A. In a partially-assembled configuration (see FIG. 8B), the track 72 of the first attachment member type 70A is slid into the adapter 54 with the side walls 76 sliding longitudinally between the outer walls 114 and inner walls 118. Here, the cantilevered fingers 120 deflect inwardly towards each other as the locking tabs 122 engage the track end 78. As the first attachment member type 70A continues to slide within the adapter 54, the base 74 of the first attachment member type 70A abuts the strap 116 of the adapter 54, thereby ensuring a smooth, linear installation of the adapter 54 and the first attachment member type 70A. The first attachment member type 70A is slid further into the adapter 54 until a fully-assembled configuration is reached (see FIGS. 8C and 10), wherein the track end 78 of the first attachment member type 70A abuts the stop wall 112 of the adapter 54 and the cantilevered fingers 120 resiliently deflect outwardly such that the locking tabs 122 come into engagement with the fins 84 of the first attachment member type 70A. As shown in FIG. 10, the bottom edge of the side walls 76 of the track 72 are supported on the braces 140 and the strap 116 is seated above and against the base 74 while the tab 80 extends into the nose 124 beneath the top surface 126 to prevent pivotal movement in either direction of the adapter 54 relative to the attachment member 70.

The adapter 54 of the present invention significantly improves retention between the wiper assembly 46 and the first attachment member type 70A of the wiper arm 44 and, at the same time, provides simple, reliable, releasable attachment. Specifically, those having ordinary skill in the art will appreciate that the adapter 54 of the present invention enables installation with a "pinch tab" style wiper arm 44 attachment member 70 in a linear fashion (see FIGS. 8A-8C). Thus, the wiper arm 44 and adapter 54 do not pivot with respect to each other during installation. Moreover, it will be appreciated that liner attachment afforded by the adapter 54 enables a more secure connection of the wiper assembly 46 and the wiper arm 44 at more advantageous installation angles and, thus, significantly improves ease-of-use on a substantial number of vehicle 30 types, makes, and models, in particular where the vehicle 30 utilizes a cowl 32 that covers or otherwise partially hides the wiper arm 44.

As noted above, in one embodiment of the present invention, the adapter 54 is also configured to attach to a second attachment member type 70B, which is depicted in FIGS. 14A-14B. This embodiment of the adapter 54 is depicted in FIGS. 11-13 and 15A-20, and includes the same structural features described above in connection with the embodiment depicted in FIGS. 4-6 and 8A-10. Thus, it will be appreciated that the embodiment of the adapter 54 depicted in FIGS. 11-13 and 15A-20 attaches to the first attachment member type 70A in the same way as the embodiment depicted in FIGS. 4-6 and 8A-10, as described above. For this reason, and for the purposes of clarity and consistency, the same reference numerals used in connection with the adapter 54 depicted in FIGS. 4-6 and 8A-10 will also be used in connection with the embodiment of the adapter 54 is depicted in FIGS. 11-13 and 15A-20. Moreover, the description of the operation and attachment procedure of the adapter 54 depicted in FIGS. 4-6 and 8A-10 to the first attachment member type 70A is hereby incorporated by reference with respect to the embodiment of the adapter 54 depicted in FIGS. 11-13 and 15A-20. Further, certain reference numerals used in FIGS. 4-6 and 8A-10 have been omitted from FIGS. 11-13 and 15A-20 for clarity.

Referring now to FIGS. 11-13 and 15A-20, another embodiment of the adapter 54 of the present invention is shown. As noted above, this adapter 54 is configured to releasably secure to both the first attachment member type 70A depicted in FIGS. 7A-7B (see FIGS. 18B and 20) and the second attachment member type 70B depicted in FIGS. 14A-14B (see FIGS. 18A and 19). Here, the stop wall 112 of the adapter 54 is provided for abutting at least a portion of either: the track end 78 of the track 72 of the first attachment member type 70A, or the terminal end 88 of the second attachment member type 70B (compare FIGS. 19 and 20). Similarly, in this embodiment, the strap 116 is provided for engaging either: the base 74 of the track 72 of the first attachment member type 70A, or the upper wall 90 of the second attachment member type 70B (compare FIGS. 19 and 20). In this embodiment, the adapter 54 also includes a resilient finger, generally indicated at 160, which is operatively attached to the body 106 between the inner walls 118. The resilient finger 160 has a tooth 162 extending vertically for engaging the aperture 104 formed in the upper wall 90 of the second attachment member type 70B. As descried in greater detail below, the tooth 162 engages the aperture 104 of the second attachment member type 70B so as to prevent longitudinal movement between the adapter 54 and the second attachment member type 70B when the stop wall 112 abuts the terminal end 88 of the second attachment member type 70B. Here, the brace 140 is formed on the body 106 at the first end 108 for being received in one of the cutouts 96 of the second attachment member type 70B when the tooth 162 of the resilient finger 160 engages the aperture 104 of the second attachment member type 70B.

Figure 11:
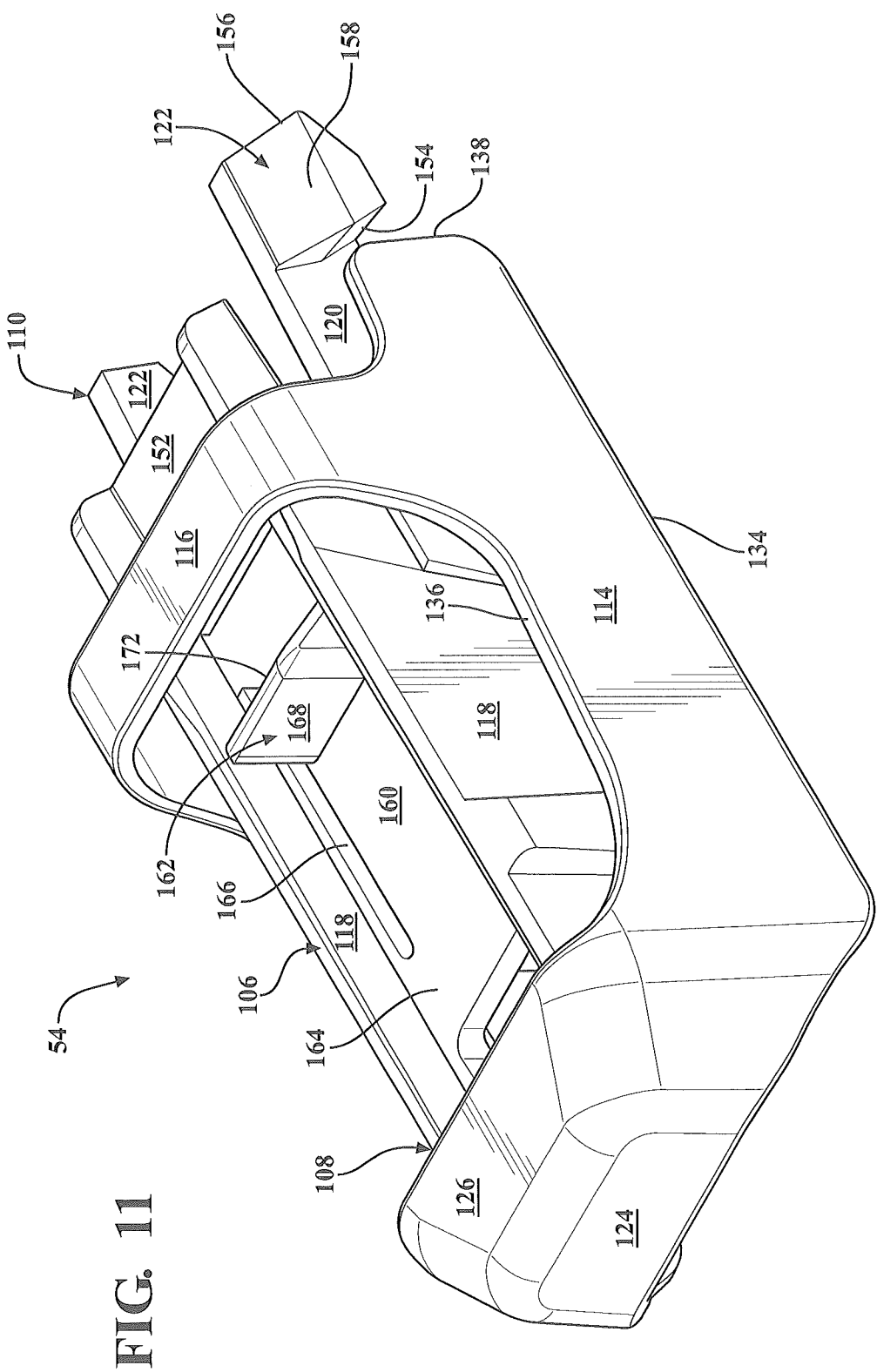
FIG. 11 is an enlarged perspective view an adapter according to another embodiment of the present invention which is also configured for releasable attachment to the first attachment member type shown in FIGS. 7A-9B.
Figure 12:
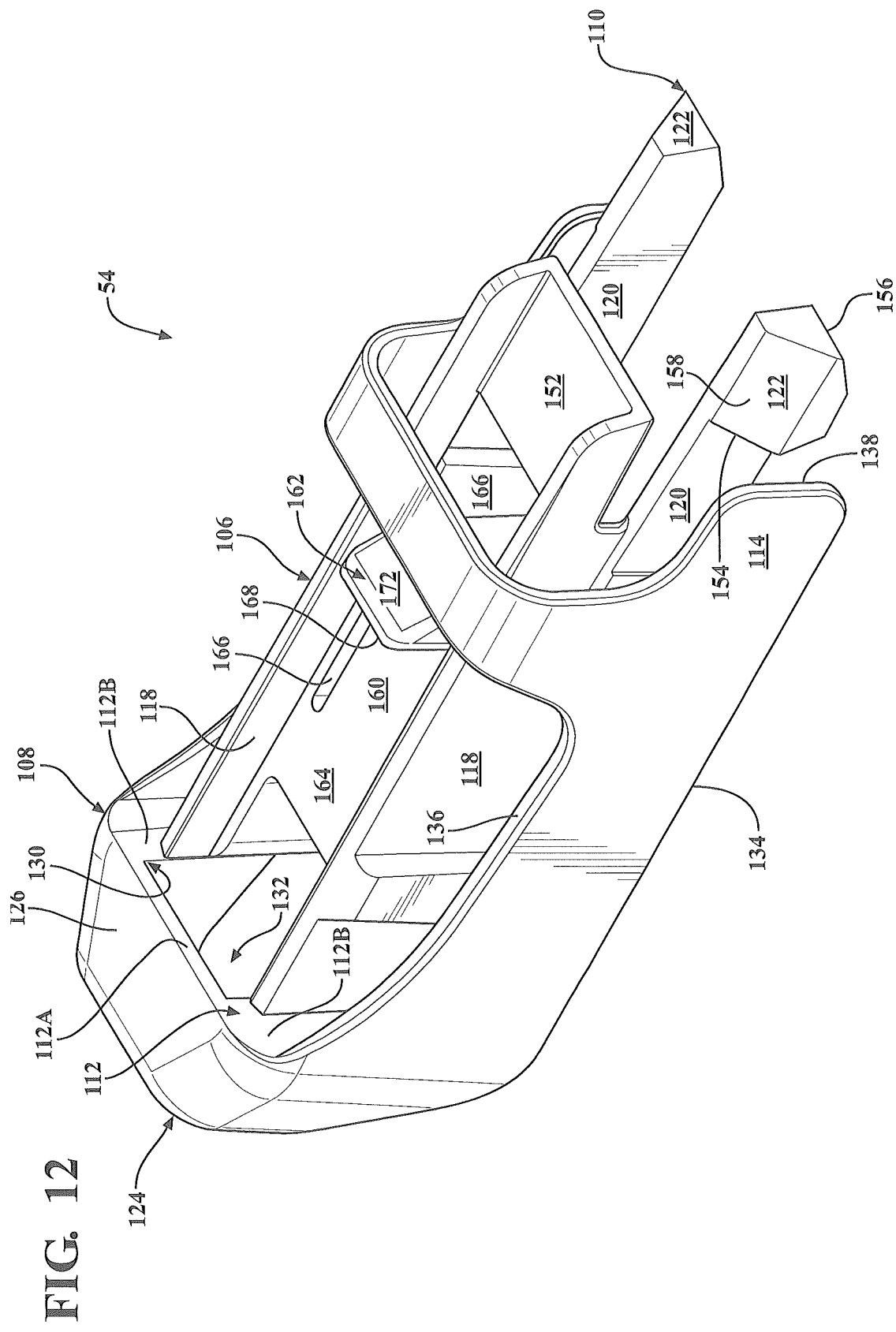
FIG. 12 is a rotated perspective view of the adapter of FIG. 11.
Figure 13:
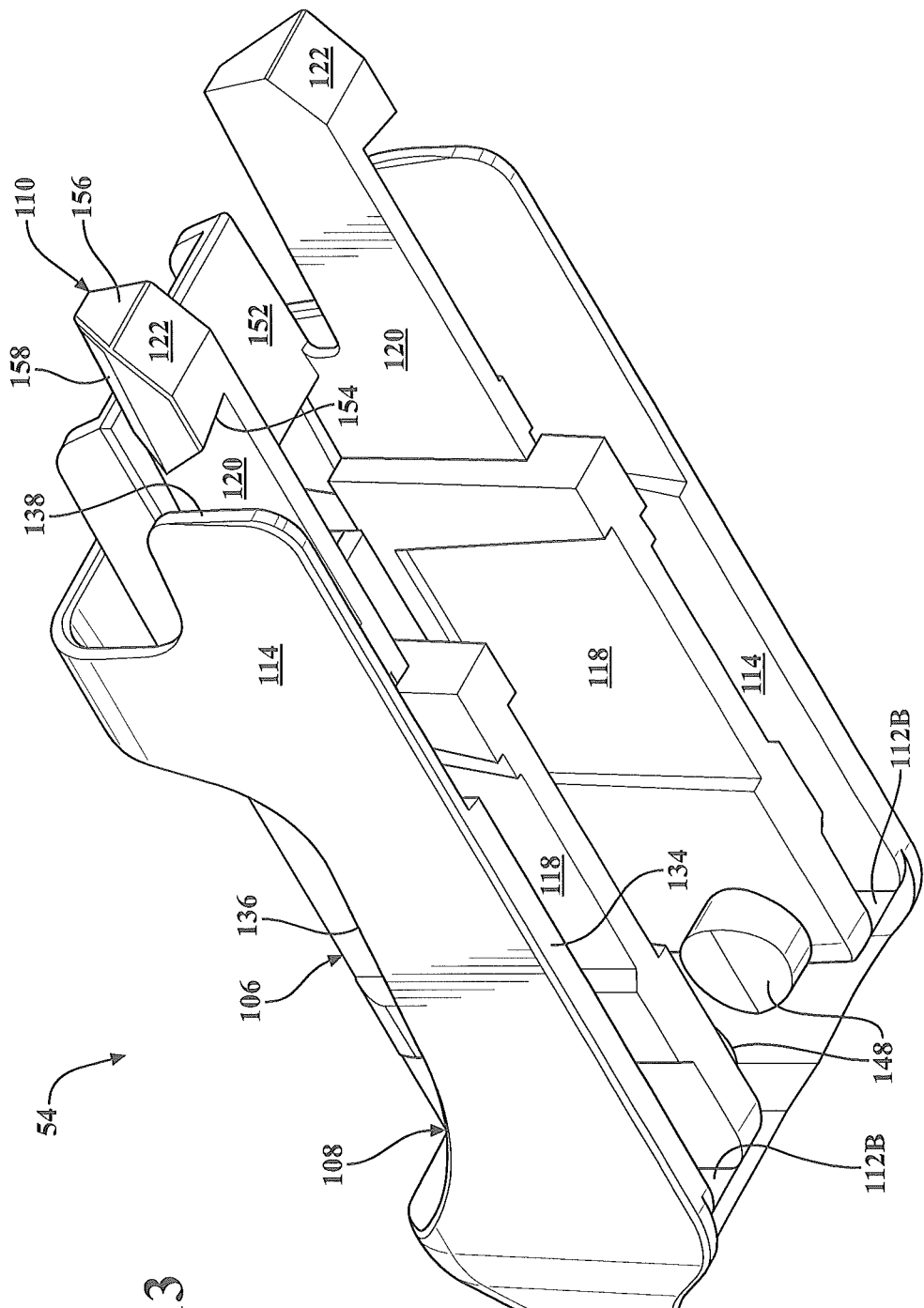
FIG. 13 is a rotated perspective view of the adapter of FIGS. 10-11.
Figure 17:
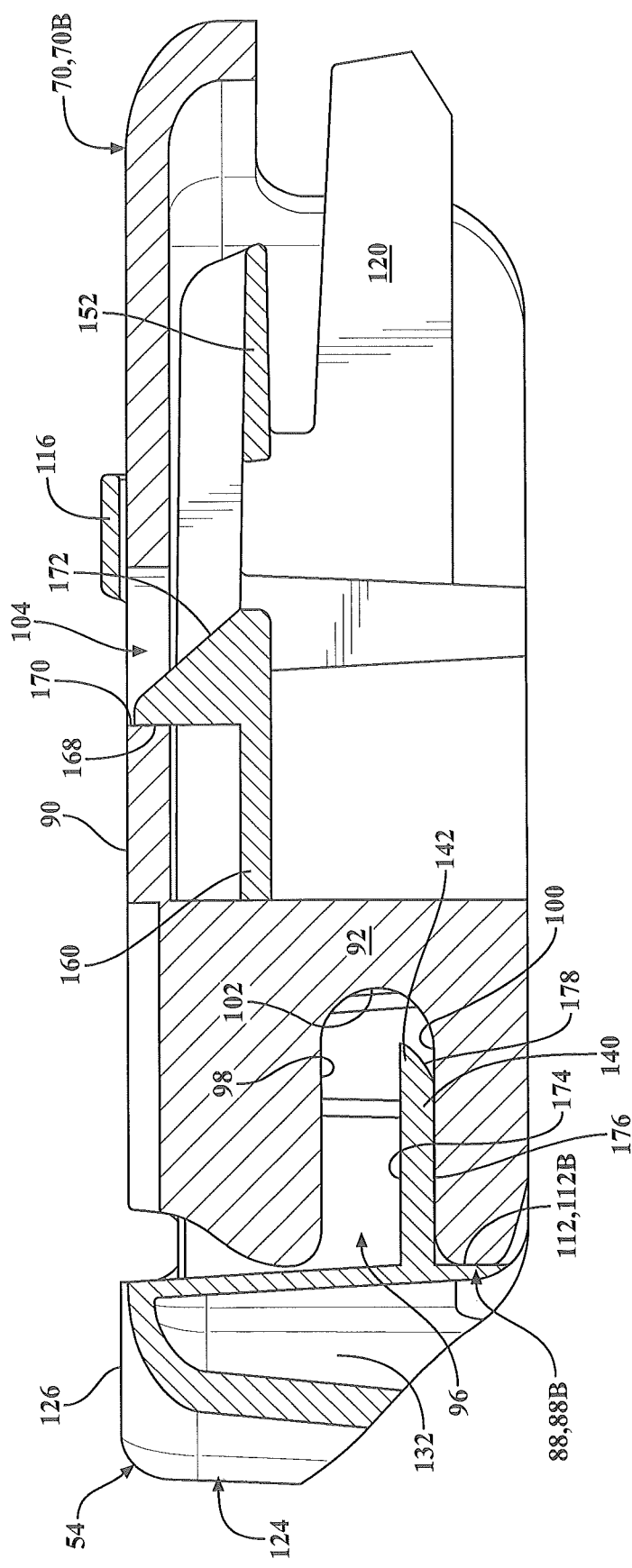
FIG. 17 is a sectional view taken along line 17-17 of FIG. 16A.
Figure 18A:
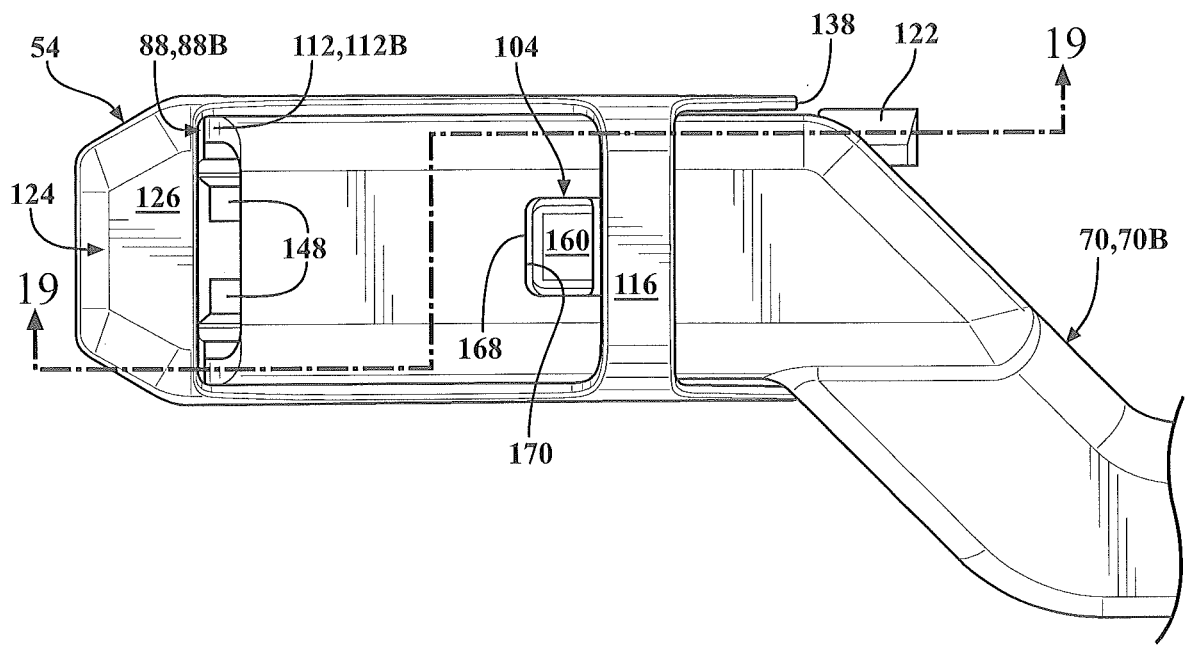
FIG. 18A is a partial top-side view of the adapter and the second attachment member type of FIG. 16A shown secured in the fourth configuration.
Figure 18B:
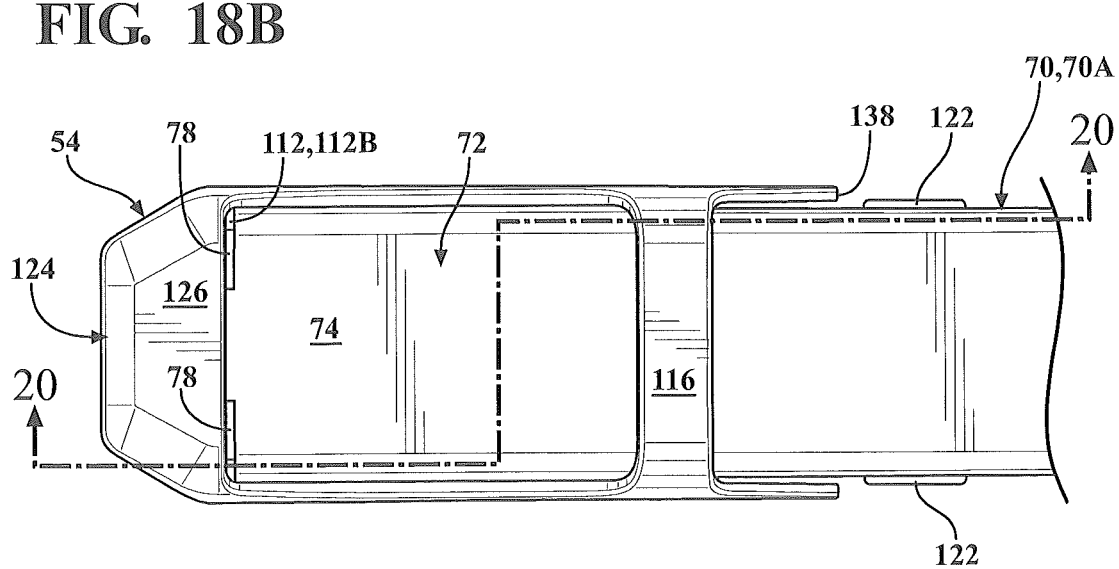
FIG. 18B is a partial top-side view of the adapter of FIG. 18A shown secured to the first attachment member type of FIGS. 7A-7B in the fully-assembled configuration.
Figure 19:
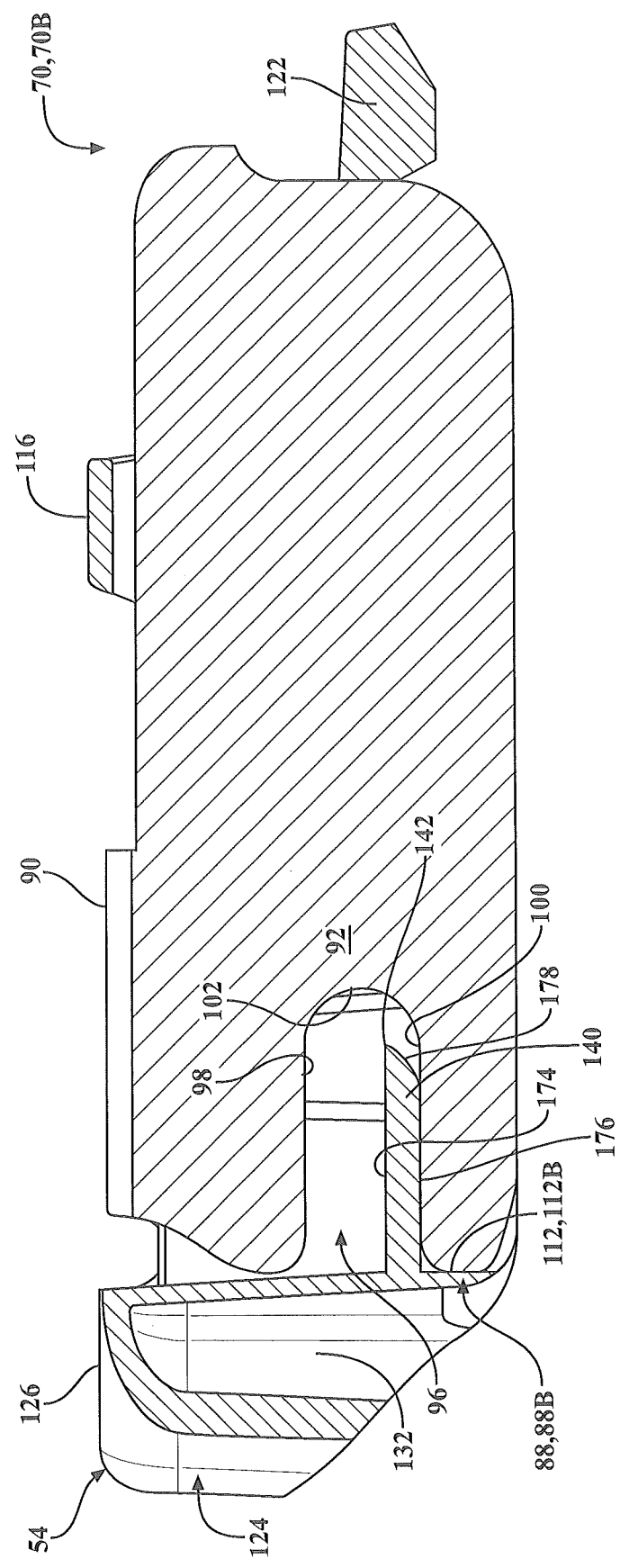
FIG. 19 is a sectional view taken along line 19-19 of FIG. 18A, with the adapter of FIGS. 11-13 shown secured to the second attachment member type of FIGS. 16A-16B in the fourth configuration.

As shown best in FIGS. 11, 12, and 17, in one embodiment, the adapter 54 includes a deck 164 extending laterally between the inner walls 118. The deck 164 is spaced longitudinally from both the stop wall 112 and the alignment guide 152. Here, the resilient finger 160 extends into a window 166 formed in the deck 164 of the adapter 54 between the first end 108 and the second end 119. The tooth 162 of the resilient finger 160 has a generally rounded-rectangular profile that compliments the profile of the aperture 104 of the second attachment member type 70B.

As shown best in FIG. 17, the tooth 162 has a tooth face 168 arranged to abut a corresponding aperture face 170 of the aperture 104 of the second attachment member type 70B. The tooth 162 also has a cam face 172 which faces away from the tooth face 168 arranged so as to deflect the resilient finger 160 and tooth 162 downwardly into the window 166 in response to engagement with either: the terminal end 60 of the second attachment member type 70B, or the bent tab 80 of the first attachment member type 70A. More specifically, the front edge 88A of the second attachment member type 70B engages the cam face 172 of the tooth 162 so as to deflect the resilient finger 160 and tooth 162 downwardly until the aperture 104 of the second attachment member type 70B comes into longitudinal alignment with the tooth 162, after which the resilient finger 160 returns upwardly out of the window 166 and the tooth face 168 of the tooth 162 abuts the aperture face 170 of the aperture 104 so as to restrict longitudinal movement between the adapter 54 and the second attachment member type 70B. It will be appreciated that the resilient finger 160 will remain deflected when the adapter 54 is secured to the first attachment member type 70A, with the tooth 162 abutting a portion of the base 74 of the track 72 of the first attachment member type 70A.

Figure 20:
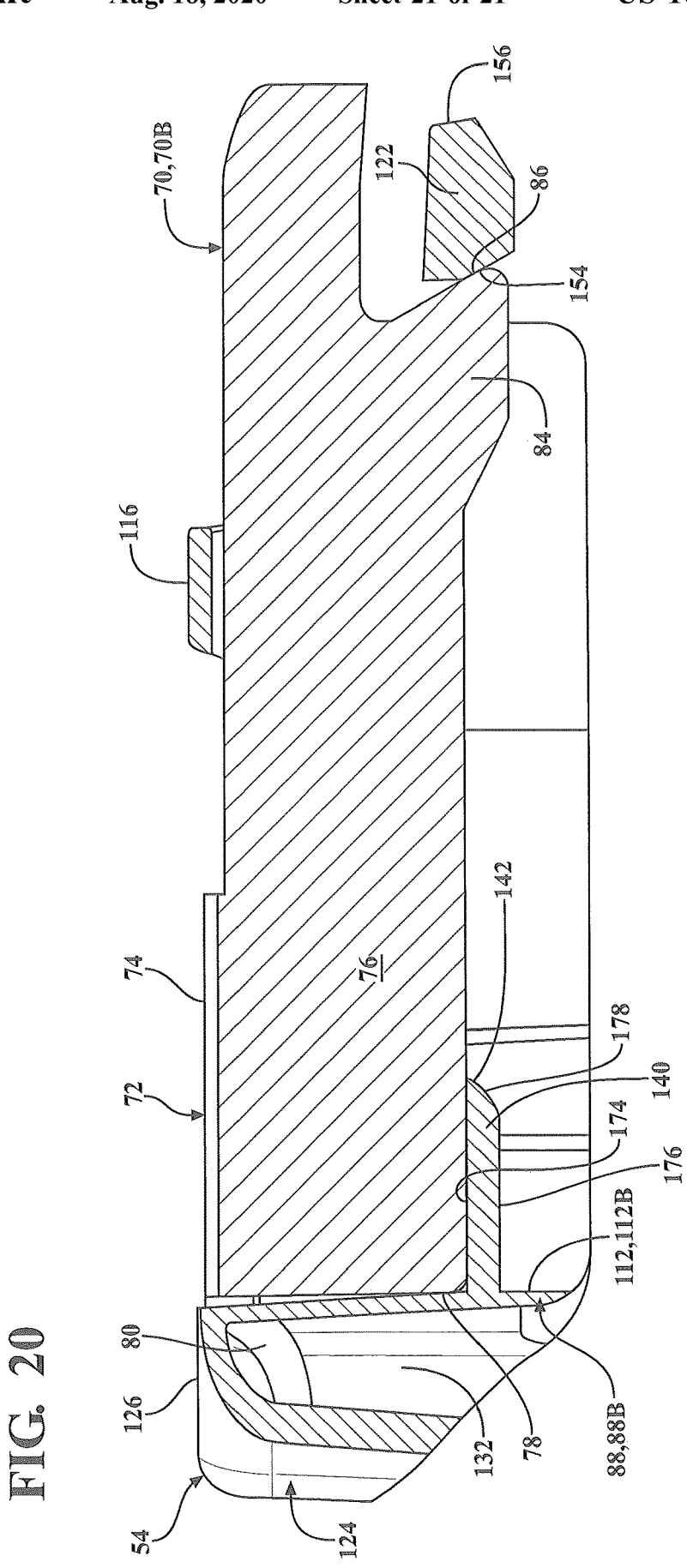
FIG. 20 is a sectional view taken along line 20-20 of FIG. 18B, with the adapter of FIGS. 11-13 shown secured to the first attachment member type of FIGS. 7A-7B in the fully-assembled configuration.

Referring again to FIGS. 19 and 20, in this embodiment, the brace 140 at least partially abuts the lower cutout edge 100 of the second attachment member type 70B and remains spaced from the upper cutout edge 98 of the second attachment member type 70B. Similarly, as shown in FIG. 20, the braces 140 abut the walls 76 of the track 72 of the first attachment member type 70A. Thus, the braces 140 are shaped and arranged such that both the first and second attachment member type 70A, 70B can be supported vertically in cooperation with the stop wall 112. More specifically, the braces 140 extend from the stop side walls 112B of the stop wall 112 and each has an upper brace surface 174, a lower brace surface 176, and a curve brace surface 178.

When the second attachment member type 70B is secured to the adapter 54, the lower brace surface 176 at least partially abuts the lower cutout edge 100 of the cutout 96 of the second attachment member type 70B, and the upper brace surface 174 is spaced below the upper cutout edge 98 of the cutout 96 of the second attachment member type 70B. More specifically, no portion of the adapter 54 engages or otherwise abuts the upper cutout edge 98 of the cutout 96 of the second attachment member type 70B. The lower brace surface 176 extends to and merges with the curve brace surface 178 which, in turn, curves upward to and merges with the upper brace surface 174 at the brace end 142. In the representative embodiment illustrated herein, the curve brace surface 178 is spaced longitudinally from the curve cutout edge 102 of the cutout 96 of the second attachment member type 70B (see FIG. 19). However, it will be appreciated that the braces 140 could be configured such that the curve brace surface 178 abuts or otherwise engages a portion of the cutout edge 102 of the cutout 96 of the second attachment member type 70B when the adapter 54 is secured to the attachment member 58.

Figure 15A:
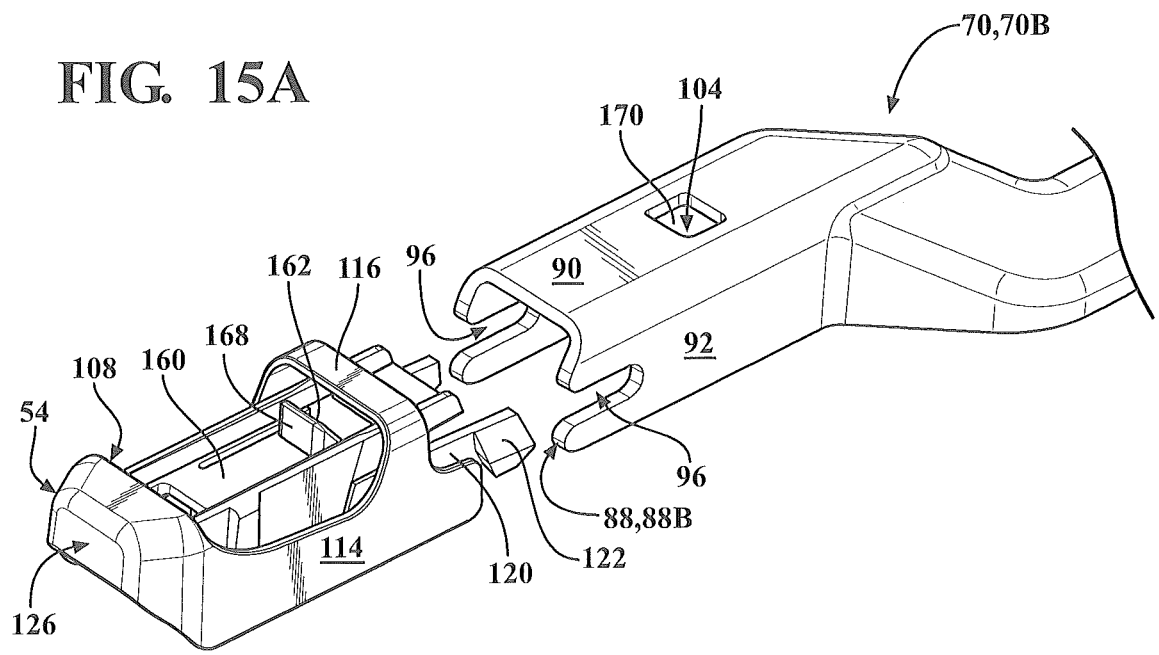
FIG. 15A is a perspective view of the adapter of FIGS. 11-13 shown in a first configuration spaced from the second attachment member type of FIGS. 14A-14B.
Figure 15B:
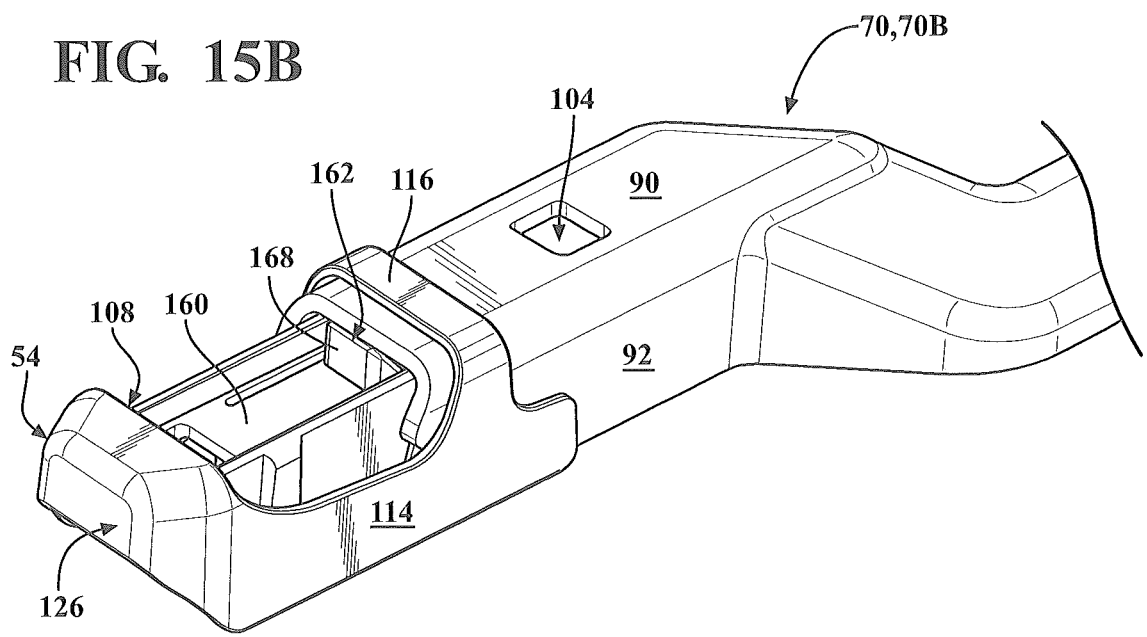
FIG. 15B is a perspective view of the adapter and the second attachment member type of FIG. 15A shown in a second configuration with the second attachment member type beginning to slide into engagement with the adapter.
Figure 15C:
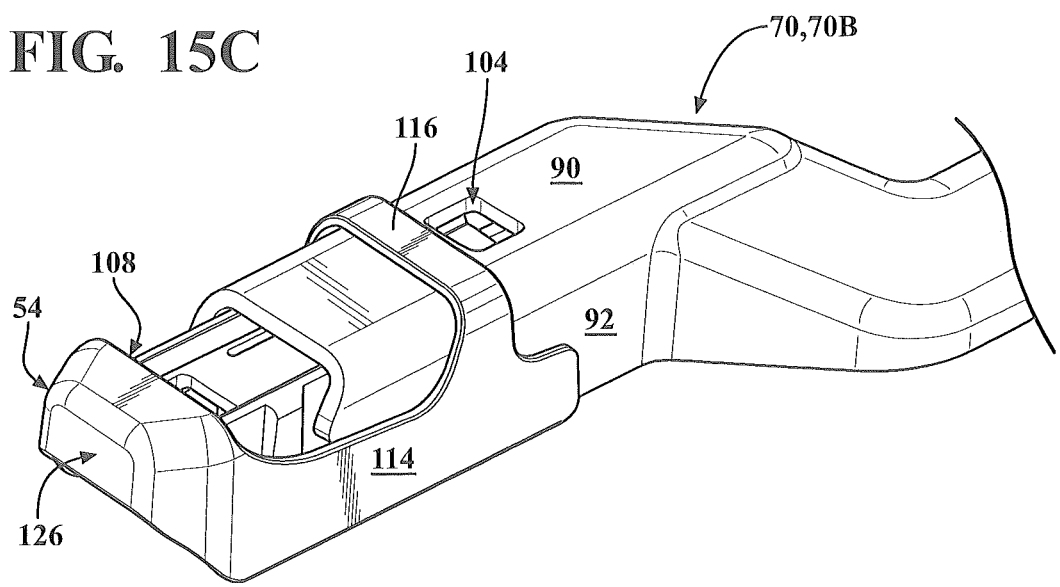
FIG. 15C is a perspective view of the adapter and the second attachment member type of FIGS. 15A-15B shown in a third configuration with the second attachment member type continuing to slide into engagement with the adapter.
Figure 15D:
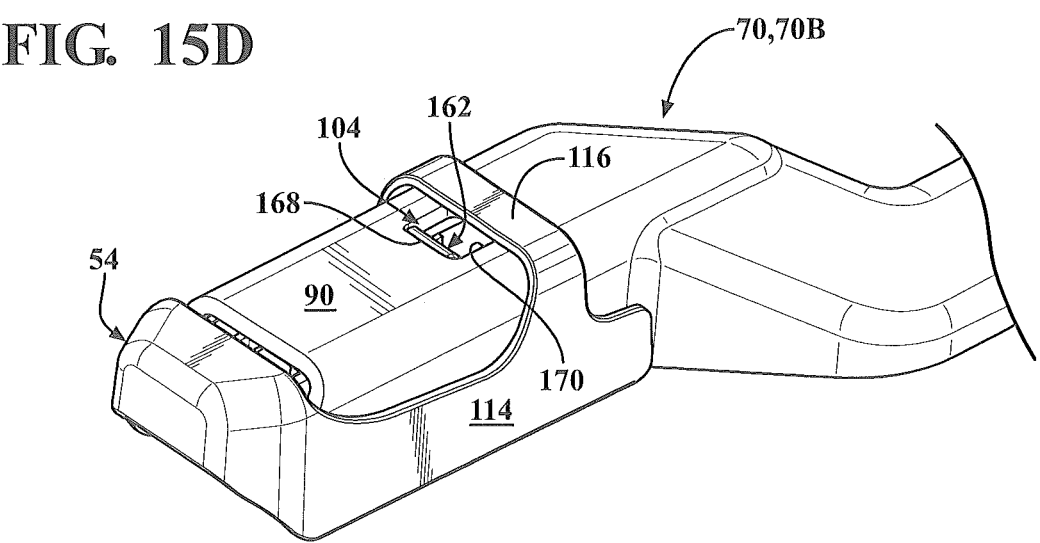
FIG. 15D is a perspective view of the adapter and the second attachment member type of FIGS. 15A-15C shown in a fourth configuration with the adapter secured to the second attachment member type.
Figure 16A:
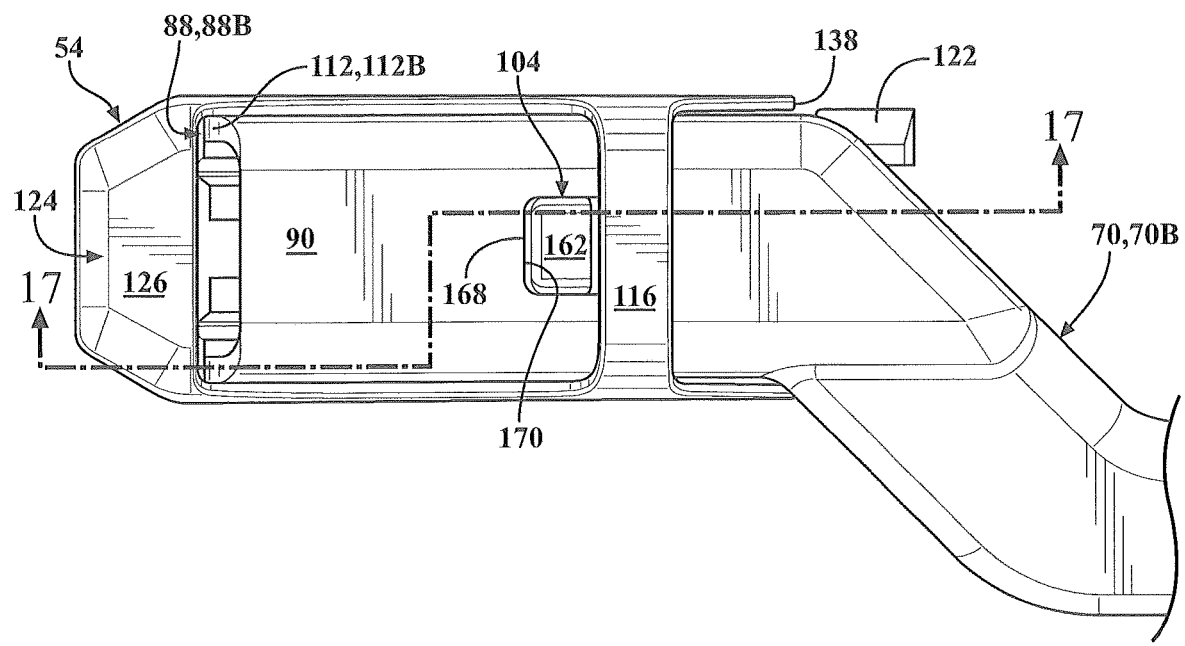
FIG. 16A is a partial top-side view of the adapter and the second attachment member type of FIG. 15D shown secured in the fourth configuration.
Figure 16B:
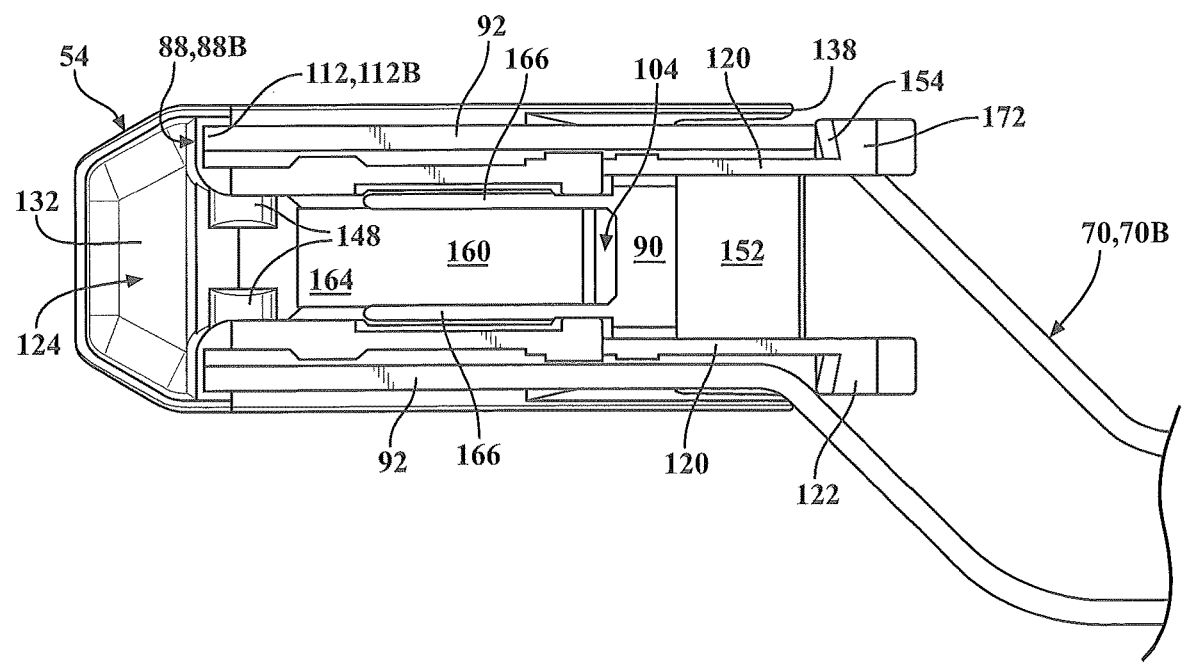
FIG. 16B is a partial bottom-side view of the adapter and the second attachment member type of FIG. 16A shown secured in the fourth configuration.

In operation, to effect proper connection to the second attachment member type 70B the adapter 54 of the wiper assembly 46 is positioned in a first configuration such that the second attachment member type 70B is near the adapter 54 (see FIG. 15A). Next, the second attachment member type 70B is slid linearly into the adapter 54, deflecting the cantilevered fingers 120 inwardly. The second attachment member type 70B is slide under the strap 116 until a second configuration is achieved in which the front edge 88A of the terminal end 88 of the second attachment member type 70B comes into contact with the cam face 172 of the tooth 162 of the resilient finger 160 of the adapter 54 (see FIG. 15B). Here, the protrusions 94 of the second attachment member type 70B remain spaced laterally from the inner walls 118 of the adapter 54. Additionally, the side walls 92 are aligned and sliding longitudinally between the outer walls 114 and inner walls 118. As the second attachment member type 70B is moved longitudinally towards the first end 108 of the adapter 54 into a third configuration, the strap 116 abuts the upper wall 90 of the second attachment member type 70B, which guides the second attachment member type 70B linearly into the adapter 54 and helps deflect the tooth 162 and the resilient finger 160 downwardly into the window 166 as the lower brace surfaces 176 of the braces 140 come into abutment with the lower cutout edges 100 of the cutouts 96 of the second attachment member type 70B (see FIG. 15C). As the second attachment member type 70B is moved longitudinally further towards the first end 108 of the adapter 54, the lower curved edges 88B of the terminal end 88 of the second attachment member type 70B come into abutment with the stop side walls 112B of the stop wall 112 of the adapter 54 below the braces 140 (see FIG. 17). As the aperture 104 of the second attachment member type 70B comes into longitudinal alignment with the tooth 162 of the adapter 54 in a fourth configuration, whereby the resilient finger 160 returns upwardly out of the window 166 and the tooth face 168 of the tooth 162 abuts the aperture face 170 of the aperture 104 so as to restrict longitudinal movement between the second attachment member type 70B and the adapter 54 (see FIG. 15D). Additionally, as shown in FIG. 17, the lower cutout edge 100 of the side walls 92 are supported below the braces 140 and the strap 116 is seated above and against the upper wall 90 to prevent pivotal movement in either direction of the adapter 54 relative to the attachment member 70.

Here, the adapter 54 of the present invention significantly improves retention between the wiper assembly 46 and the second attachment member type 70B of the wiper arm 44 and, at the same time, provides simple, reliable, releasable attachment. Specifically, those having ordinary skill in the art will appreciate that the adapter 54 of the present invention enables installation with the second attachment member type 70B of the wiper arm 44 in a linear fashion (see FIGS. 15A-15D). Thus, the wiper arm 44 and adapter 54 do not pivot with respect to each other during installation. Moreover, it will be appreciated that liner attachment afforded by the adapter 54 enables a more secure connection of the wiper assembly 46 and the wiper arm 44 at more advantageous installation angles and, thus, significantly improves ease-of-use on a substantial number of vehicle 30 types, makes, and models, in particular where the vehicle 30 utilizes a cowl 32 that covers or otherwise partially hides the wiper arm 44.

In this way, the present invention provides for simple, releasable attachment of the wiper assembly 46 to attachment member 70 of wiper arms 44 as described above. Those having ordinary skill in the art will appreciate that various components and structural features of the adapter 54 cooperate to efficiently secure attachment members 70 longitudinally, vertically, and laterally with respect to the adapter 54 without necessitating complicated relative positioning of the wiper arm 44 and/or the wiper assembly 46 with respect to the windshield 40 of the vehicle. Specifically, those having ordinary skill in the art will appreciate that the adapter 54 of the present invention enables installation of the wiper assembly 46 to attachment members 70 in a substantially longitudinal direction. Thus, the adapter 54 affords increased opportunity for connection of the wiper assembly 46 and wiper arm 44 in more advantageous positions and at significantly shallow angles. Further, the adapter 54 affords minimal play between the wiper arm 44 and the secured wiper assembly 46, thereby ensuring improved wipe quality and optimized life of the wiper assembly 46 in use. Moreover, it will be appreciated that the adapter 54 strikes a substantial balance between usability and manufacturability while, at the same time, affording significant opportunities for improved wiper assemblies 46 used in wiper systems 32.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An adapter for use in releasably attaching a wiper assembly to a wiper arm having an attachment member including a track defined by a base and walls depending therefrom, a bent tab extending outwardly from the base, and fins that extend from the walls, said adapter comprising:
    a body having a first end and a second end;
    a stop wall formed on said body adjacent to said first end for abutting at least a portion of the track of the attachment member of the wiper arm;
    a pair of outer walls extending longitudinally between said first end and said second end;
    a strap connecting said outer walls for engaging the base of the attachment member of the wiper arm;
    a pair of inner walls spaced laterally between said outer walls and arranged at least partially under said strap; and
    a cantilevered finger extending longitudinally from each of said inner walls with a locking tab formed adjacent to said second end, said locking tabs extending laterally away from each other and including a tapered outer wall, said locking tabs arranged so as to respectively engage the fins of the attachment member so as to prevent longitudinal movement between said adapter and the attachment member when said stop wall abuts the track of the attachment member.

2. A wiper assembly for use in releasably attaching to a wiper arm attachment member having a track defined by a base and walls depending therefrom, a bent tab extending outwardly from the base, and fins that extend from the walls, said wiper assembly comprising:

a wiping element adapted to contact the surface to be wiped;

at least one elongated spline acting to support said wiping element;

a coupler operatively attached to said spline; and an adapter pivotally attached to said coupler, said adapter including:
- a body having a first end and a second end;
- a stop wall formed on said body adjacent to said first end for abutting at least a portion of the track of the attachment member of the wiper arm;
- a pair of outer walls extending longitudinally between said first end and said second end;
- a strap connecting said outer walls for engaging the base of the attachment member of the wiper arm;
- a pair of inner walls spaced laterally between said outer walls and arranged at least partially under said strap; and
- a cantilevered finger extending longitudinally from each of said inner walls with a locking tab formed adjacent to said second end, said locking tabs extending laterally away from each other and including a tapered outer wall, said locking tabs arranged so as to respectively engage the fins of the attachment member so as to prevent longitudinal movement between said adapter and the attachment member when said stop wall abuts the track of the attachment member.

3. An adapter for use in releasably attaching a wiper assembly to first and second wiper arm attachment member types, the first attachment member type including a track defined by a base and walls depending therefrom, a bent tab extending outwardly from the base, and fins that extend from the walls; the second attachment member type extending to a terminal end with an upper wall and a pair of side walls depending therefrom, the side walls each having an inwardly-extending protrusion spaced longitudinally from the terminal end and a U-shaped cutout formed at the terminal end defining upper and lower cutout edges, and the upper wall having an aperture spaced longitudinally from the terminal end; said adapter comprising:
- a body having a first end and a second end;
- a stop wall formed on said body adjacent to said first end for abutting at least a portion of:
  - the track of the first attachment member type, or
  - the terminal end of the second attachment member type;
- a pair of outer walls extending longitudinally between said first end and said second end;
- a strap connecting said outer walls for engaging:
  - the base of the first attachment member type, or
  - the upper wall of the second attachment member type;
- a pair of inner walls spaced laterally between said outer walls and arranged at least partially under said strap;
- a cantilevered finger extending longitudinally from each of said inner walls with a locking tab formed adjacent to said second end, said locking tabs extending laterally away from each other and arranged so as to respectively engage the fins of the first attachment member type so as to prevent longitudinal movement between said adapter and the first attachment member type when said stop wall abuts the track of the first attachment member type;
- a resilient finger operatively attached to said body between said inner walls and having a tooth for engaging the aperture of the second attachment member type so as to prevent longitudinal movement between said adapter and the second attachment member type when said stop wall abuts the terminal end of the second attachment member type; and
- at least one brace formed on said body at said first end for being received in one of the cutouts of the second attachment member type when said tooth of said resilient finger engages the aperture of the second attachment member type wherein said brace is adapted and arranged to at least partially abut the lower cutout edge of the second attachment member type and remain spaced from the upper cutout edge of the second attachment member type.

4. A wiper assembly for use in releasably attaching to first and second wiper arm attachment member types, the first attachment member type including a track defined by a base and walls depending therefrom, a bent tab extending outwardly from the base, and fins that extend from the walls; the second attachment member type extending to a terminal end with an upper wall and a pair of side walls depending therefrom, the side walls each having an inwardly-extending protrusion spaced longitudinally from the terminal end and a U-shaped cutout formed at the terminal end defining upper and lower cutout edges, and the upper wall having an aperture spaced longitudinally from the terminal end; said wiper assembly comprising:
- a wiping element adapted to contact the surface to be wiped;
- at least one elongated spline acting to support said wiping element;
- a coupler operatively attached to said spline; and
- an adapter pivotally attached to said coupler, said adapter including:
  - a body having a first end and a second end;
  - a stop wall formed on said body adjacent to said first end for abutting at least a portion of:
    - the track of the first attachment member type, or
    - the terminal end of the second attachment member type;
  - a pair of outer walls extending longitudinally between said first end and said second end;
  - a strap connecting said outer walls for engaging:
    - the base of the first attachment member type, or
    - the upper wall of the second attachment member type;
  - a pair of inner walls spaced laterally between said outer walls and arranged at least partially under said strap;
  - a cantilevered finger extending longitudinally from each of said inner walls with a locking tab formed adjacent to said second end, said locking tabs extending laterally away from each other and arranged so as to respectively engage the fins of the first attachment member type so as to prevent longitudinal movement between said adapter and the first attachment member type when said stop wall abuts the track of the first attachment member type;
  - a resilient finger operatively attached to said body between said inner walls and having a tooth for engaging the aperture of the second attachment member type so as to prevent longitudinal movement between said adapter and the second attachment member type when said stop wall abuts the terminal end of the second attachment member type; and
  - at least one brace formed on said body at said first end for being received in one of the cutouts of the second attachment member type when said tooth of said resilient finger engages the aperture of the second attachment member type wherein said brace is adapted and arranged to at least partially abut the lower cutout edge of the second attachment member type and remain spaced from the upper cutout edge of the second attachment member type.

\* \* \* \* \*